(12) United States Patent
Chen et al.

(10) Patent No.: US 8,918,533 B2
(45) Date of Patent: Dec. 23, 2014

(54) VIDEO SWITCHING FOR STREAMING VIDEO DATA

(75) Inventors: Ying Chen, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 321 days.

(21) Appl. No.: 13/031,067

(22) Filed: Feb. 18, 2011

(65) Prior Publication Data

US 2012/0016965 A1 Jan. 19, 2012

Related U.S. Application Data

(60) Provisional application No. 61/363,884, filed on Jul. 13, 2010, provisional application No. 61/366,436, filed on Jul. 21, 2010, provisional application No. 61/374,222, filed on Aug. 16, 2010, provisional application No. 61/433,110, filed on Jan. 14, 2011.

(51) Int. Cl.
G06F 15/16 (2006.01)
H04N 21/2343 (2011.01)

(52) U.S. Cl.
CPC .............................. *H04N 21/23439* (2013.01)
USPC ........................................................ 709/231

(58) Field of Classification Search
USPC ........................................................ 709/231
See application file for complete search history.

(56) References Cited

U.S. PATENT DOCUMENTS

| | | | |
|---|---|---|---|
| 4,901,319 A | 2/1990 | Ross | |
| 5,371,532 A | 12/1994 | Gelman et al. | |
| 5,379,297 A | 1/1995 | Glover et al. | |
| 5,421,031 A | 5/1995 | De Bey | |
| 5,566,208 A | 10/1996 | Balakrishnan | |
| 5,617,541 A | 4/1997 | Albanese et al. | |
| 5,659,614 A | 8/1997 | Bailey, III | |
| 5,701,582 A | 12/1997 | DeBey | |
| 5,751,336 A | 5/1998 | Aggarwal et al. | |

(Continued)

FOREIGN PATENT DOCUMENTS

| | | |
|---|---|---|
| CN | 1338839 A | 3/2002 |
| CN | 1481643 A | 3/2004 |

(Continued)

OTHER PUBLICATIONS

Vetro et al., "Joint Draft 8.0 on Multiview Video Coding," 28th Meeting: Hannover, Germany, Jul. 20-25, 2008, 63 pp.

(Continued)

*Primary Examiner* — Larry Donaghue
(74) *Attorney, Agent, or Firm* — Brent A. Boyd

(57) ABSTRACT

In one example, an apparatus includes a processor configured to provide information to a client device for accessing data for a first representation of a video sequence and a second representation of the video sequence, and to provide information to the client device indicating that the client device can, during transmission of the data for the first representation, switch to the second representation without experiencing a presentation gap when displaying the video sequence and without simultaneously executing more than one decoder to decode the data for the first representation and the second representation during the switch, in response to a first request from the client device to retrieve data from the first representation. In this manner, the client device may use the information to perform seamless switching between the representations.

46 Claims, 8 Drawing Sheets

(56) References Cited

U.S. PATENT DOCUMENTS

| | | | |
|---|---|---|---|
| 5,757,415 A | 5/1998 | Asamizuya et al. |
| 5,802,394 A | 9/1998 | Baird et al. |
| 5,835,165 A | 11/1998 | Keate et al. |
| 5,844,636 A | 12/1998 | Joseph et al. |
| 5,903,775 A | 5/1999 | Murray |
| 5,926,205 A | 7/1999 | Krause et al. |
| 5,936,659 A | 8/1999 | Viswanathan et al. |
| 5,936,949 A | 8/1999 | Pasternak et al. |
| 6,011,590 A | 1/2000 | Saukkonen |
| 6,018,359 A | 1/2000 | Kermode et al. |
| 6,061,820 A | 5/2000 | Nakakita et al. |
| 6,073,250 A | 6/2000 | Luby et al. |
| 6,079,041 A | 6/2000 | Kunisa et al. |
| 6,081,909 A | 6/2000 | Luby et al. |
| 6,134,596 A | 10/2000 | Bolosky et al. |
| 6,141,053 A | 10/2000 | Saukkonen |
| 6,141,787 A | 10/2000 | Kunisa et al. |
| 6,163,870 A | 12/2000 | Luby et al. |
| 6,166,544 A | 12/2000 | Debbins et al. |
| 6,185,265 B1 | 2/2001 | Campanella |
| 6,195,777 B1 | 2/2001 | Luby et al. |
| 6,226,259 B1 | 5/2001 | Piret |
| 6,307,487 B1 | 10/2001 | Luby |
| 6,320,520 B1 | 11/2001 | Luby |
| 6,411,223 B1 | 6/2002 | Haken et al. |
| 6,415,326 B1 * | 7/2002 | Gupta et al. ............... 709/231 |
| 6,459,811 B1 | 10/2002 | Hurst, Jr. |
| 6,486,803 B1 | 11/2002 | Luby et al. |
| 6,496,980 B1 | 12/2002 | Tillman et al. |
| 6,510,177 B1 | 1/2003 | De et al. |
| 6,631,172 B1 | 10/2003 | Shokrollahi et al. |
| 6,732,325 B1 | 5/2004 | Tash et al. |
| 6,804,202 B1 | 10/2004 | Hwang |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,937,618 B1 | 8/2005 | Noda et al. |
| 6,985,459 B2 | 1/2006 | Dickson |
| 7,068,681 B2 | 6/2006 | Chang et al. |
| 7,068,729 B2 | 6/2006 | Shokrollahi et al. |
| 7,073,191 B2 | 7/2006 | Srikantan et al. |
| 7,100,188 B2 | 8/2006 | Hejna et al. |
| 7,113,773 B2 | 9/2006 | Quick, Jr. et al. |
| 7,143,433 B1 | 11/2006 | Duan et al. |
| 7,151,754 B1 | 12/2006 | Boyce et al. |
| 7,154,951 B2 | 12/2006 | Wang |
| 7,164,882 B2 | 1/2007 | Poltorak |
| 7,240,358 B2 | 7/2007 | Horn et al. |
| 7,257,764 B2 | 8/2007 | Suzuki et al. |
| 7,304,990 B2 | 12/2007 | Rajwan |
| 7,318,180 B2 | 1/2008 | Starr |
| 7,363,048 B2 | 4/2008 | Cheng et al. |
| 7,391,717 B2 | 6/2008 | Klemets et al. |
| 7,409,626 B1 | 8/2008 | Schelstraete |
| 7,483,447 B2 | 1/2009 | Chang et al. |
| 7,483,489 B2 | 1/2009 | Gentric et al. |
| 7,529,806 B1 | 5/2009 | Shteyn |
| 7,555,006 B2 | 6/2009 | Wolfe et al. |
| 7,650,036 B2 | 1/2010 | Lei et al. |
| 7,720,096 B2 | 5/2010 | Klemets |
| 7,924,913 B2 | 4/2011 | Sullivan et al. |
| 7,961,700 B2 | 6/2011 | Malladi et al. |
| 7,979,769 B2 | 7/2011 | Lee et al. |
| 8,027,328 B2 | 9/2011 | Yang et al. |
| 8,028,322 B2 | 9/2011 | Riedl et al. |
| 8,081,716 B2 | 12/2011 | Kang et al. |
| 8,135,073 B2 | 3/2012 | Shen |
| 8,185,794 B2 | 5/2012 | Lohmar et al. |
| RE43,741 E | 10/2012 | Shokrollahi et al. |
| 8,301,725 B2 | 10/2012 | Biderman et al. |
| 8,327,403 B1 | 12/2012 | Chilvers et al. |
| 8,340,133 B2 | 12/2012 | Kim et al. |
| 8,422,474 B2 | 4/2013 | Park et al. |
| 8,462,643 B2 | 6/2013 | Walton et al. |
| 8,615,023 B2 | 12/2013 | Oh et al. |
| 8,638,796 B2 | 1/2014 | Dan et al. |
| 8,737,421 B2 | 5/2014 | Zhang et al. |
| 2001/0015944 A1 | 8/2001 | Takahashi et al. |
| 2001/0033586 A1 | 10/2001 | Takashimizu et al. |
| 2002/0009137 A1 | 1/2002 | Nelson et al. |
| 2002/0083345 A1 | 6/2002 | Halliday et al. |
| 2002/0085013 A1 | 7/2002 | Lippincott |
| 2002/0133247 A1 | 9/2002 | Smith et al. |
| 2002/0143953 A1 | 10/2002 | Aiken |
| 2002/0191116 A1 | 12/2002 | Kessler et al. |
| 2003/0005386 A1 | 1/2003 | Bhatt et al. |
| 2003/0138043 A1 | 7/2003 | Hannuksela |
| 2003/0194211 A1 | 10/2003 | Abecassis |
| 2003/0207696 A1 | 11/2003 | Willenegger et al. |
| 2003/0224773 A1 | 12/2003 | Deeds |
| 2004/0015768 A1 | 1/2004 | Bordes et al. |
| 2004/0031054 A1 | 2/2004 | Dankworth et al. |
| 2004/0049793 A1 | 3/2004 | Chou |
| 2004/0081106 A1 | 4/2004 | Bruhn |
| 2004/0096110 A1 | 5/2004 | Yogeshwar et al. |
| 2004/0117716 A1 | 6/2004 | Shen |
| 2004/0240382 A1 | 12/2004 | Ido et al. |
| 2004/0255328 A1 | 12/2004 | Baldwin et al. |
| 2005/0084006 A1 | 4/2005 | Lei et al. |
| 2005/0091697 A1 | 4/2005 | Tanaka et al. |
| 2005/0097213 A1 | 5/2005 | Barrett et al. |
| 2005/0123058 A1 | 6/2005 | Greenbaum et al. |
| 2005/0163468 A1 | 7/2005 | Takahashi et al. |
| 2005/0180415 A1 | 8/2005 | Cheung et al. |
| 2005/0193309 A1 | 9/2005 | Grilli et al. |
| 2005/0195752 A1 | 9/2005 | Amin et al. |
| 2005/0216472 A1 | 9/2005 | Leon et al. |
| 2005/0254575 A1 | 11/2005 | Hannuksela et al. |
| 2006/0015568 A1 | 1/2006 | Walsh et al. |
| 2006/0031738 A1 | 2/2006 | Fay et al. |
| 2006/0037057 A1 | 2/2006 | Xu |
| 2006/0087456 A1 | 4/2006 | Luby |
| 2006/0107174 A1 | 5/2006 | Heise |
| 2006/0120464 A1 | 6/2006 | Hannuksela |
| 2006/0212444 A1 | 9/2006 | Handman et al. |
| 2006/0229075 A1 | 10/2006 | Kim et al. |
| 2006/0244824 A1 | 11/2006 | Debey |
| 2006/0244865 A1 | 11/2006 | Simon |
| 2006/0248195 A1 | 11/2006 | Toumura et al. |
| 2006/0256851 A1 | 11/2006 | Wang et al. |
| 2006/0279437 A1 | 12/2006 | Luby et al. |
| 2007/0002953 A1 | 1/2007 | Kusunoki |
| 2007/0006274 A1 | 1/2007 | Paila et al. |
| 2007/0016594 A1 | 1/2007 | Visharam et al. |
| 2007/0022215 A1 | 1/2007 | Singer et al. |
| 2007/0078876 A1 | 4/2007 | Hayashi et al. |
| 2007/0140369 A1 | 6/2007 | Limberg |
| 2007/0162568 A1 | 7/2007 | Gupta et al. |
| 2007/0162611 A1 | 7/2007 | Yu et al. |
| 2007/0185973 A1 | 8/2007 | Wayda et al. |
| 2007/0201549 A1 | 8/2007 | Hannuksela et al. |
| 2007/0204196 A1 | 8/2007 | Watson et al. |
| 2007/0230568 A1 | 10/2007 | Eleftheriadis et al. |
| 2007/0233784 A1 | 10/2007 | Orourke et al. |
| 2007/0255844 A1 | 11/2007 | Shen et al. |
| 2007/0277209 A1 | 11/2007 | Yousef |
| 2008/0059532 A1 | 3/2008 | Kazmi et al. |
| 2008/0066136 A1 | 3/2008 | Dorai et al. |
| 2008/0075172 A1 | 3/2008 | Koto |
| 2008/0086751 A1 | 4/2008 | Horn et al. |
| 2008/0101478 A1 | 5/2008 | Kusunoki |
| 2008/0134005 A1 | 6/2008 | Izzat et al. |
| 2008/0170564 A1 | 7/2008 | Shi et al. |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0215317 A1 | 9/2008 | Fejzo |
| 2008/0243918 A1 | 10/2008 | Holtman |
| 2008/0256418 A1 | 10/2008 | Luby et al. |
| 2008/0281943 A1 | 11/2008 | Shapiro |
| 2008/0285556 A1 | 11/2008 | Park et al. |
| 2008/0303893 A1 | 12/2008 | Kim et al. |
| 2008/0313191 A1 | 12/2008 | Bouazizi |
| 2009/0003439 A1 | 1/2009 | Wang et al. |

(56) References Cited

U.S. PATENT DOCUMENTS

| | | |
|---|---|---|
| 2009/0019229 A1 | 1/2009 | Morrow et al. |
| 2009/0043906 A1 | 2/2009 | Hurst et al. |
| 2009/0055705 A1 | 2/2009 | Gao |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0106356 A1 | 4/2009 | Brase et al. |
| 2009/0125636 A1 | 5/2009 | Li et al. |
| 2009/0150557 A1* | 6/2009 | Wormley et al. ............. 709/231 |
| 2009/0164653 A1 | 6/2009 | Mandyam et al. |
| 2009/0201990 A1 | 8/2009 | Leprovost et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0319563 A1 | 12/2009 | Schnell |
| 2009/0328228 A1 | 12/2009 | Schnell |
| 2010/0020871 A1 | 1/2010 | Hannuksela et al. |
| 2010/0023525 A1 | 1/2010 | Westerlund et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0131671 A1 | 5/2010 | Kohli et al. |
| 2010/0153578 A1 | 6/2010 | Van Gassel et al. |
| 2010/0174823 A1 | 7/2010 | Huang |
| 2010/0189131 A1 | 7/2010 | Branam et al. |
| 2010/0211690 A1 | 8/2010 | Pakzad et al. |
| 2010/0235472 A1 | 9/2010 | Sood et al. |
| 2010/0235528 A1 | 9/2010 | Bocharov et al. |
| 2010/0257051 A1 | 10/2010 | Fernandez |
| 2010/0318632 A1 | 12/2010 | Yoo et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0119394 A1 | 5/2011 | Wang et al. |
| 2011/0119396 A1 | 5/2011 | Kwon et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0268178 A1 | 11/2011 | Park et al. |
| 2011/0307545 A1 | 12/2011 | Bouazizi |
| 2012/0013746 A1 | 1/2012 | Chen et al. |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047280 A1 | 2/2012 | Park et al. |
| 2012/0099593 A1 | 4/2012 | Luby |
| 2012/0151302 A1 | 6/2012 | Luby et al. |
| 2012/0202535 A1 | 8/2012 | Chaddha et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0246643 A1 | 9/2013 | Luby et al. |
| 2013/0254634 A1 | 9/2013 | Luby |
| 2013/0287023 A1 | 10/2013 | Bims |
| 2014/0009578 A1 | 1/2014 | Chen et al. |

FOREIGN PATENT DOCUMENTS

| | | |
|---|---|---|
| CN | 1708934 A | 12/2005 |
| CN | 1714577 A | 12/2005 |
| CN | 1806392 A | 7/2006 |
| CN | 1868157 A | 11/2006 |
| CN | 101390399 A | 3/2009 |
| CN | 101729857 A | 6/2010 |
| EP | 0669587 A2 | 8/1995 |
| EP | 0701371 A1 | 3/1996 |
| EP | 0784401 A2 | 7/1997 |
| EP | 0986908 A1 | 3/2000 |
| EP | 1051027 A1 | 11/2000 |
| EP | 1124344 A1 | 8/2001 |
| EP | 1298931 A2 | 4/2003 |
| EP | 1455504 A2 | 9/2004 |
| EP | 1670256 A2 | 6/2006 |
| EP | 2071827 A2 | 6/2009 |
| EP | 1700410 B1 | 4/2010 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11164270 A | 6/1999 |
| JP | 2000151426 A | 5/2000 |
| JP | 2000513164 A | 10/2000 |
| JP | 2000353969 A | 12/2000 |
| JP | 2001094625 | 4/2001 |
| JP | 2001223655 A | 8/2001 |
| JP | 2001274776 A | 10/2001 |
| JP | 2002073625 A | 3/2002 |
| JP | 2002543705 A | 12/2002 |
| JP | 2003092564 A | 3/2003 |
| JP | 2003174489 | 6/2003 |
| JP | 2003256321 A | 9/2003 |
| JP | 2003318975 A | 11/2003 |
| JP | 2003319012 | 11/2003 |
| JP | 2003333577 A | 11/2003 |
| JP | 2004070712 A | 3/2004 |
| JP | 2004135013 A | 4/2004 |
| JP | 2004192140 A | 7/2004 |
| JP | 2004193992 A | 7/2004 |
| JP | 2004529533 A | 9/2004 |
| JP | 2004343701 A | 12/2004 |
| JP | 2004362099 A | 12/2004 |
| JP | 2005094140 A | 4/2005 |
| JP | 2005277950 A | 10/2005 |
| JP | 2006503463 A | 1/2006 |
| JP | 2006074335 A | 3/2006 |
| JP | 2006115104 A | 4/2006 |
| JP | 2006174045 A | 6/2006 |
| JP | 2006186419 A | 7/2006 |
| JP | 2006287422 A | 10/2006 |
| JP | 2006319743 A | 11/2006 |
| JP | 2007013675 A | 1/2007 |
| JP | 2007089137 A | 4/2007 |
| JP | 2007158592 A | 6/2007 |
| JP | 2007228205 A | 9/2007 |
| JP | 2008011404 A | 1/2008 |
| JP | 2008508761 A | 3/2008 |
| JP | 2008283232 A | 11/2008 |
| JP | 2008283571 A | 11/2008 |
| JP | 2009027598 A | 2/2009 |
| JP | 2009522922 A | 6/2009 |
| JP | 2009171558 A | 7/2009 |
| JP | 2009527949 A | 7/2009 |
| JP | 2009544991 A | 12/2009 |
| JP | 4971144 B2 | 7/2012 |
| JP | 5231218 | 3/2013 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 20080083299 A | 9/2008 |
| KR | 20090098919 A | 9/2009 |
| RU | 99117925 A | 7/2001 |
| RU | 2189629 C2 | 9/2002 |
| RU | 2265960 C2 | 12/2005 |
| RU | 2312390 C2 | 12/2007 |
| TW | 1246841 B | 1/2006 |
| WO | 9750183 A1 | 12/1997 |
| WO | 9804973 A1 | 2/1998 |
| WO | 9832256 A1 | 7/1998 |
| WO | 0157667 A1 | 8/2001 |

(56) References Cited

FOREIGN PATENT DOCUMENTS

| | | |
|---|---|---|
| WO | 0158130 A2 | 8/2001 |
| WO | 0158131 A2 | 8/2001 |
| WO | 0227988 A2 | 4/2002 |
| WO | 02063461 A1 | 8/2002 |
| WO | 2004015948 A1 | 2/2004 |
| WO | 2004036824 A1 | 4/2004 |
| WO | 2004047019 A2 | 6/2004 |
| WO | 2004047455 A1 | 6/2004 |
| WO | 2004109538 A1 | 12/2004 |
| WO | 2005107123 | 11/2005 |
| WO | 2006013459 A1 | 2/2006 |
| WO | 2006057938 A2 | 6/2006 |
| WO | 2006060036 A1 | 6/2006 |
| WO | 2006084503 A1 | 8/2006 |
| WO | 2006116102 A2 | 11/2006 |
| WO | 2006135878 A2 | 12/2006 |
| WO | 2007078253 A2 | 7/2007 |
| WO | 2007098397 A2 | 8/2007 |
| WO | 2008011549 A2 | 1/2008 |
| WO | 2008023328 A3 | 4/2008 |
| WO | 2008054100 A1 | 5/2008 |
| WO | 2008085013 A1 | 7/2008 |
| WO | 2008086313 A1 | 7/2008 |
| WO | 2008144004 A1 | 11/2008 |
| WO | 2009143741 A1 | 12/2009 |
| WO | 2010085361 A2 | 7/2010 |
| WO | 2011059286 A2 | 5/2011 |
| WO | 2011070552 A1 | 6/2011 |
| WO | 2011102792 A1 | 8/2011 |

OTHER PUBLICATIONS

Sullivan, "Editors' draft revision to ITU-T Rec. H.264 | ISO/IEC 14496-10 Advanced Video Coding—in preparation for ITU-T SG 16 AAP Consent (in integrated form)," 30th Meeting: Geneva, Switzerland, Jan. 29-Feb. 3, 2009, 683 pp.

Information Technology—Generic Coding of Moving Pictures and Audio: Systems, Amendment 4: Transport of Multiview Video over ITU-T Rec H.222.0 | ISO/IEC 13818-1 "Text of ISO/IEC 13818-1:2007/FPDAM 4—Transport of Multiview Video over ITU-T Rec H.222.0 | ISO/IEC 13818-1," Lausanne, Switzerland, 2009, 21 pp.

Sun et al., "Seamless Switching of Scalable Video Bitstreams for Efficient Streaming," IEEE Transactions on Multimedia, vol. 6, No. 2, Apr. 2004, pp. 291-303.

Anonymous: "Technologies under Consideration", 98. MPEG Meeting; Nov. 28, 2011-Dec. 2, 2011; Geneva; (Motion Picture Expert Group or ISO/IEC JTC1/SC291WG11), No. N12330, Dec. 3, 2011, XP030018825.

Anonymous: "Text of ISO/IEC IS 23009-1 Media Presentation Description and Segment Formats", 98. MPEG Meeting; Nov. 28, 2011-Dec. 2, 2012; Geneva; (Motion Picture Expert Group or ISO/IEC JTC1/SC29/WG11), No. N12329, Jan. 6, 2012, XP030018824.

"Digital Video Broadcasting (DVB); Framing structure, channel coding and modulation for digital terrestrial television; ETSI EN 300 744" ETSI Standards, LIS, Sophia Antipolis Cedex, France, V1.6.1, pp. 9, Jan. 10, 2009 (Jan. 2009).

Kim J., et al., "Enhanced Adaptive Modulation and Coding Schemes Based on Multiple Channel Reportings for Wireless Multicast Systems", 62nd IEEE Vehicular Technology Conference, VTC-2005-Fall, Sep. 25-28, 2005, vol. 2, pp. 725-729, XP010878578, DOI: 1 0.11 09/VETECF.2005.1558019, ISBN: 978-0-7803-9152-9.

Moriyama, S., "5. Present Situation of Terrestrial Digital Broadcasting in Europe and USA", Journal of The Institute of Image Information and Television Engineers, Nov. 20, 1999, vol. 53, No. 11, pp. 1476-1478.

3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005, XP002695256, Retrieved from the Internet: URL:http://www.etsi.org/deliver/etsi_ts/126300_126399/126346/06.01.00_60/ts_126346v060100p.pdf.

3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, 179 pages.

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pages.

3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010, 91 pages.

3rd Generation Partnership Project, Technical Specification Group Services and System Aspects Transparent end-to-end packet switched streaming service (PSS), 3GPP file format (3GP) (Release 9) , 3GPP Standard, 3GPP TS 26.244, 3rd Generation Partnership Project (3GPP), Mobile Competence Centre , 650, Route Des Lucioles , F-06921 Sophia-Antipolis Cedex , France, No. V8.1.0, Jun. 1, 2009, pp. 1-52, XP050370199.

3rd Generation Partnership Project; Technical Specification Group Services and System Aspects; Transparent end-to-end packet switched streaming service (PSS); 3GPP file format (3GP) (Release 9), 3GPP Standard; 3GPP TS 26.244, 3rd Generation Partnership Project (3GPP), Mobile Competence Centre; 650, Route Des Lucioles; F-06921 Sophia-Antipolis Cedex; France, No. V9.2.0, Jun. 9, 2010, pp. 1-55, XP050441544, [retrieved on Jun. 9, 2010].

3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP Standard; 3GPP TS 26.247, 3rd Generation Partnership Project (3GPP), Mobile Competence Centre ; 650, Route Des Lucioles ; F-06921 Sophia-Antipolis Cedex ; France, vol. SA WG4, No. V10.0.0, Jun. 17, 2011, pp. 1-94, XP050553206, [retrieved on Jun. 17, 2011].

Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).

Aggarwal, C. et al.: "On Optimal Batching Policies for Video-on-Demand Storage Servers," Multimedia Systems, vol. 4, No. 4, pp. 253-258 (1996).

Albanese, A., et al., "Priority Encoding Transmission", IEEE Transactions on Information Theory, vol. 42, No. 6, pp. 1-22, (Nov. 1996).

Alex Zambelli,"IIS Smooth Streaming Technical Overview", Microsoft Mar. 25, 2009, XP002620446, Retrieved from the Internet: URL:http://www.microsoft.com/downloads/en/ details. aspx"FamilyID=03d22583-3ed6-44da-8464-b1b4b5ca7520, [retrieved on Jan. 21, 2011].

Almeroth, et al., "The use of multicast delivery to provide a scalable and interactive video-on-demand service", IEEE Journal on Selected Areas in Communication, 14(6): 1110-1122, (1996).

Amon P. et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.

Anonymous: [Gruneberg, K., Narasimhan, S. and Chen, Y., editors] "Text of ISO/IEC 13818-1:2007/PDAM 6 MVC operation point descriptor", 90 MPEG Meeting; 26-10;-2009-30-10-2009; Xian; (Motion Picture Expertgroup or ISO/IEC JTC1/SC29/WG11), No. N10942, Nov. 19, 2009, XP030017441.

Anonymous: "Technologies under Consideration", 100. MPEG Meeting; Apr. 30, 2012-May 4, 2012; Geneva; (Motion Picture Expert Group or ISO/IEC JTC1 /SC29/WG11) No. N12682, Jun. 7, 2012, XP030019156.

Anonymous: "Text of ISO/IEC 14496-12 3rd Edition", 83 MPEG Meeting; Jan. 14. 2008-Jan. 18, 2008; Antalya; (Motion Pictureexpert Group or ISO/IEC JTC1/SC29/WG11), No. N9678, Apr. 22, 2008, XP030016172.

(56) References Cited

OTHER PUBLICATIONS

Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11) No. N11139, Jan. 22, 2010, XP030017636, ISSN: 0000-0030 the whole document.
Atis: "PTV Content On Demand Service", IIF-WT-063R44, Nov. 11, 2010, pp. 1-124, XP055045168, Retrieved from the Internet: URL:ftp://vqeg.its.bldrdoc.gov/Documents/VQEG_Atlanta_Nov10/Meeting Files/Liaison/IIF-WT-063R44_Content_on_Demand.pdf [retrieved on Nov. 22, 2012].
Bar-Noy, et al., "Competitive on-line stream merging algorithms for media-on-demand", Draft (Jul. 2000), pp. 1-34.
Bar-Noy et al. "Efficient algorithms for optimal stream merging for media-on-demand," Draft (Aug. 2000), pp. 1-43.
Blomer, et al., "An XOR-Based Erasure-Resilient Coding Scheme," ICSI Technical Report No. TR-95-048 (1995) [avail. At ftp://ftp.icsi.berkeley.edu/pub/techreports/1995/tr-95-048.pdf].
Bouazizi I., et al., "Proposals for ALC/FLUTE server file format (14496-12Amd.2)", 77. MPEG Meeting; Jul. 17, 2006-Jul. 27, 2006; Klagenfurt; (Motion Pictureexpert Group or ISO/IEC JTC1/SC29/VVG11), No. M13675, Jul. 12, 2006, XP030042344, ISSN: 0000-0236.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, Ch, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Chen et al., "Response to the CfP on HTTP Streaming: Adaptive Video Streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.
Dan, A. et al.: "Scheduling Policies for an On-Demand Video Server with Batching," Proc. ACM Multimedia, pp. 15-23 (Oct. 1998).
Eager, et al. "Minimizing bandwidth requirements for on-demand data delivery," Proceedings of the International Workshop on Advances in Multimedia Information Systems, p. 80-87 (Indian Wells, CA Oct. 1999).
Eager, et al., "Optimal and efficient merging schedules for video-on-demand servers", Proc. ACM Multimedia, vol. 7, pp. 199-202 (1999).
Fernando, et al., "httpstreaming of MPEG Media—Response to CfP", 93 MPEG Meeting; Jul. 26, 2010-Jul. 30, 2010; Geneva; (Motion Picture Expert Group or ISO/IEC JTC1/SCE29/WG11), No. M17756, Jul. 22, 2010, XP030046346.
Fielding et al., "RFC 2616: Hypertext Transfer Protocol HTTP/1.1", Internet Citation, Jun. 1999, pp. 165, XP002196143, Retrieved from the Internet: URL:http://www.rfc-editor-org/ [retrieved on Apr. 15, 2002].
Frojdh P., et al., "Study on 14496-12:2005/PDAM2 ALU/ FLUTE Server File Format", 78. MPEG Meeting; Oct. 23, 2006-Oct. 27, 2006; Hangzhou: (Motion Picturexpert Group or ISO/ IEC JTC1/SC29/WG11), No. M13855, Oct. 13, 2006, XP030042523, ISSN: 0000-0233.
Gao, L. et al.: "Efficient Schemes for Broadcasting Popular Videos," Proc. Inter. Workshop on Network and Operating System Support for Digital Audio and Video, pp. 1-13 (1998).
Gil A., et al., "Personalized Multimedia Touristic Services for Hybrid Broadcast/Broadband Mobile Receivers," IEEE Transactions on Consumer Electronics, 2010, vol. 56 (1), pp. 211-219.
Hannuksela M.M., et al., "DASH: Indication of Subsegments Starting with SAP", 97. MPEG Meeting; Jul. 18, 2011-Jul. 22, 2011; Torino; (Motion Picture Expert Group or ISO/IEC JTC1/SC29/WG11) No. m21096, Jul. 21, 2011, XP030049659.
Hannuksela M.M., et al., "ISOBMFF: SAP definitions and 'sidx' box", 97. MPEG Meeting; Jul. 18, 2011-Jul. 22, 2011; Torino; (Motion Picture Expert Group or ISO/IEC JTC1/SC29/WG11) No. m21435, Jul. 22, 2011, XP030049998.
Hua, et al., "Skyscraper broadcasting: A new broadcasting system for metropolitan video-on-demand systems", Proc. ACM SIGCOMM, pp. 89-100 (Cannes, France, 1997).
Huawei et al., "Implict mapping between CCE and PUCCH for ACK/NACK TDD", 3GPP Draft; R1-082359, 3rd Generation Partnership Project (3GPP), Mobile Competence Centre; 650, Route Des Lucioles; F-06921 Sophia-Antipolis Cedex; France, vol. RAN WG1, no. Warsaw, Poland, Jun. 24, 2008, XP050110650, [retrieved on Jun. 24, 2008].
International Search Report and Written Opinion—PCT/US2011/043885—ISA/EPO—Dec. 19, 2011.
International Search Report and Written Opinion—PCT/US2012/053394—ISA/EPO—Feb. 6, 2013.
International Standard ISO/IEC 14496-12, Information Technology—Coding of audio-visual objects—Part 12: ISO base media file format, Third Edition, Oct. 15, 2008, 120 pp.
ISO/IEC JTC 1/SC 29, ISO/IEC FCD 23001-6, Information technology—MPEG systems technologies—Part 6: Dynamic adaptive streaming over HTTP (DASH), Jan. 28, 2011.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang J., "File Format for Scalable Video Coding", PowerPoint Presentation for CMPT 820, Summer 2008.
Juhn, L. et al.: "Adaptive Fast Data Broadcasting Scheme for Video-on-Demand Service," IEEE Transactions on Broadcasting, vol. 44, No. 2, pp. 182-185 (Jun. 1998).
Juhn, L. et al.: "Harmonic Broadcasting for Video-on-Demand Service," IEEE Transactions on Broadcasting, vol. 43, No. 3, pp. 268-271 (Sep. 1997).
Kozamernik F: "Media streaming over the Internet", Internet Citation, Oct. 2002, XP002266291, Retrieved from the Internet: URL: http://www.ebu.ch/trev_292-kozamerni k. pdf [retrieved on Jan. 8, 2004] section "Video codecs for scalable streaming".
Li, M., et al., "Playout Buffer and Rate Optimization for Streaming over IEEE 802.11 Wireless Networks", Aug. 2009, Worcester Polytechnic Institute, USA.
Luby, et al., "FLUTE—File Delivery over Unidirectional Transport", IETF RFC 3926, Oct. 2004, pp. 1-35.
Luby et, al. "Layered Coding Transport (LCT) Building Block", IETF RFC 5651, pp. 1-42, (Oct. 2009).
Luby et al., RaptorQ Forward Error Correction Scheme for Object Delivery draft-ietf-rmt-bb-fec-raptorq-00, Qualcomm, Inc. Jan. 28, 2010.
Luby, M., et, al. "Forward Error Correction (FEC) Building Block", IETF RFC 5052, pp. 1-31, (Aug. 2007).
Luby, M., et al., "Raptor Forward Error Correction Scheme for Object Delivery", IETF RFC5053, pp. 1-46 (Sep. 2007).
Luby M. et al., "RaptorQ Forward Error Correction Scheme for Object Delivery", IETF draft ietf-rmt-bb-fec-raptorq-04, Reliable Multicast Transport, Internet Engineering Task Force (IETF), Standard Workingdraft, Internet Society (ISOC), Aug. 24, 2010, pp. 1-68, XP015070705, [retrieved on Aug. 24, 2010].
Luby, M., et al., "Request for Comments: 3453: The Use of Forward Error Correction (FEC) in Reliable Multicast," Internet Article, [Online] Dec. 2002, pp. 1-19.
Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011, pp. 1-10, XP015074424, [retrieved on Mar. 7, 2011].

(56) References Cited

OTHER PUBLICATIONS

Matsuoka H., et al., "Low-Density Parity-Check Code Extensions Applied for Broadcast-Communication Integrated Content Delivery", Research Laboratories, NTT DoCoMo, Inc., 3-6, Hikari-No-Oka, Yokosuka, Kanagawa, 239-8536, Japan, ITC-SS21, 2010 IEICE, pp. 59-63.

Michael G et al., "Improved low-density parity-check codes using irregular graphs", Information Theory, IEEE Transactions on, Feb. 2001, vol. 47, No. 2, pp. 585-598.

Motorola et al: "An Analysis of DCD Channel Mapping to Bcast File Delivery Sessions; OMA-CD-DCD-2007-0112-INP_DCD_Channel_Mapping_to_BCAST_File_Delivery", OMA-CD-DCD-2007-0112-INP_DCD_Channel_Mapping_to_BCAST_File_Delivery, Open Mobile Alliance (OMA), 4330 La Jolla Village Dr., Suite 110 San Diego, CA 92122; USA Oct. 2, 2007, pp. 1-13, XP064036903.

Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.

Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.

Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.

Ozden, B. et al.: "A Low-Cost Storage Service for Movie on Demand Databases," Proceedings of the 20th Very Large DataBases (VLDB) Conference, Santiago, Chile (1994).

Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.

Pantos R et al., "HTTP Live Streaming; draft-pantos-http-live-streaming-OT.txt ", HTTP Live Streaming; Draft-Pant0s-HTTP-Live-Streaming-01.Txt, Internet Engineering Task Force, IETF; Standardworkingdraft, Internet Society (ISOC) 4, Rue Des Falaises CH-1205 Geneva, Switzerland, No. 1, Jun. 8, 2009, XP015062692.

Paris, et al., "A low bandwidth broadcasting protocol for video on demand", Proc. International Conference on Computer Communications and Networks, vol. 7, pp. 690-697 (Oct. 1998).

Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).

Perkins, et al.: "Survey of Packet Loss Recovery Techniques for Streaming Audio," IEEE Network; Sep.-Oct. 1998, pp. 40-48.

Pyle, et al., "Microsoft http smooth Streaming: Microsoft response to the Call for Proposal on httpstreaming", 93 MPEG Meeting; Jul. 26, 2010-Jul. 7, 2010; Geneva; (Motion Picture Expert Group or ISO/IEC JTC1/SCE29/WG11), No. M17902, Jul. 22, 2010, XP030046492.

Qualcomm Europe S A R L: "Baseline Architecture and Definitions for HTTP Streaming", 3GPP Draft; S4-090603_HTTP_Streaming_Architecture, 3rd Generation Partnership Project (3GPP), Mobile Competence Centre; 650, Route Des Lucioles; F-06921 Sophia-Antipolis Cedex; France, no. Kista; Aug. 12, 2009, XP050356889.

Qualcomm Incorporated: "Use Cases and Examples for Adaptive httpstreaming", 3GPP Draft; 54-100408-Usecases-HSD, 3rd Generation Partnership Project (JGPP), Mobile Competence Centre; 650, Route Des Lucioles; F-06921 Sophia-Antipolis Cedex; France, vol. SA WG4, no. Prague, Czech Republic; Jun. 21, 2010, Jun. 17, 2010, XP050438085, [retrieved on Jun. 17, 2010].

Rangan, et al., "Designing an On-Demand Multimedia Service," IEEE Communication Magazine, vol. 30, pp. 56-64, (Jul. 1992).

Realnetworks Inc et al., "Format for HTTP Streaming Media Presentation Description", 3GPP Draft; S4-100020, 3rd Generation Partnership Project (3GPP), Mobile Competence Centre; 650, Route Des Lucioles; F-06921 Sophia-Anti Polis Cedex; France, vol. SA WG4, no. St Julians, Malta; Jan. 25, 2010, Jan. 20, 2010, XP050437753, [retrieved on Jan. 20, 2010].

Research in Motion UK Limited: "An MPD delta file for httpstreaming", 3GPP Draft; S4-100453, 3rd Generation Partnership Project (SGPP), Mobile Competence Centre; 650, Route Des Lucioles; F-06921 Sophia-Antipolis Cedex; France, vol. SA WG4, no. Prague, Czech Republic; Jun. 21, 2010, Jun. 16, 2010, XP050438066, [retrieved on Jun. 16, 2010].

Rhyu, et al., "Response to Call for Proposals on httpstreaming of MPEG Media", 93 MPEG Meeting; Jul. 26, 2010-Jul. 30, 2010; Geneva; (Motion Picture Expert Group or ISO/IEC JTC1/SCE29/WG11) No. M17779, Jul. 26, 2010, XP030046369.

Rizzo L. "Effective Erasure Codes for Reliable Computer Communication Protocols," Computer Communication Review, 27 (2) pp. 24-36 (Apr. 1, 1997), XP000696916.

Roca, V., et, al. "Low Density Parity Check (LDPC) Staircase and Triangle Forward Error Correction (FEC) Schemes", IETF RFC 5170 (Jun. 2008), pp. 1-34.

Roumy A., et al., "Unequal Erasure Protection and Object Bundle Protection with the Generalized Object Encoding Approach", Inria-00612583, Version 1, Jul. 29, 2011, 25 pages.

Schulzrinne, et al., "Real Time Streaming Protocol (RTSP)" Network Working Group, Request for Comments: 2326, Apr. 1998, pp. 1-92.

Sincoskie, W. D., "System Architecture for Large Scale Video on Demand Service," Computer Network and ISDN Systems, pp. 155-162, (1991).

Stockhammer T., et al., "DASH: Improvements on Representation Access Points and related flags", 97. MPEG Meeting; Jul. 18, 2011-Jul. 22, 2011; Torino; (Motion Picture Expert Group or ISO/IEC JTC1/SC29/WG11) No. m20339, Jul. 24, 2011, XP030048903.

Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.

Telefon AB LM Ericsson, et al., "Media Presentation Description in httpstreaming", 3GPP Draft; S4-100080-MPD, 3rd Generation Partnership Project (3GPP), Mobile Competence Centre; 650, Route Des Lucioles; F-06921 Sophia-Antipolis Cedex; France, vol. SA WG4, no. St Julians, Malta; Jan. 25, 2010, Jan. 20, 2010, XP050437773, [retrieved on Jan. 20, 2010].

U.S. Appl. No. 12/840,146, by Ying Chen et al., filed Jul. 20, 2010.

U.S. Appl. No. 12/908,537, by Ying Chen et al., filed Oct. 20, 2010.

U.S. Appl. No. 12/908,593, by Ying Chen et al., filed Oct. 20, 2010.

Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010, XP014047290, paragraphs [5.5.4.2], [5.5.4.3], [5.5.4.4], [5.4.5], [5.5.4.6] paragraphs [10.2.3], [11.2.7], [12.2.3], [12.4.2], [12.6.2] paragraphs [12.6.3], [12.6.3.1], [12.6.4], [12.6.6].

Viswanathan, et al., "Metropolitan area video-on-demand services using pyramid broadcasting", Multimedia Systems, 4(4): 197-208 (1996).

Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).

Viswanathan, Subramaniyam R., "Publishing in Wireless and Wireline Environments," Ph. D Thesis, Rutgers, The State University of New Jersey (Nov. 1994), 180pages.

Wadayama T, "Introduction to Low Density Parity Check Codes and Sum-Product Algorithm," Technical Report of the Institute of Electronics, Information and Communication Engineers, Dec. 6, 2001, vol. 101, No. 498, pp. 39-46, MR2001-83.

Watson, M., et, al. "Asynchronous Layered Coding (ALC) Protocol Instantiation", IETF RFC 5775, pp. 1-23, (Apr. 2010).

(56) References Cited

OTHER PUBLICATIONS

Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

Wong, J.W., "Broadcast delivery", Proceedings of the IEEE, 76(12): 1566-1577, (1988).

Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.

Zorzi, et al.: "On the Statistics of Block Errors in Bursty Channels," IEEE Transactions on Communications, vol. 45, No. 6, Jun. 1997, pp. 660-667.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Makoto N., et al., "On Tuning of Blocking LU decomposition for VP2000 series" The 42th Information Processing Society of Japan Conference (1st term in 1991), Feb. 25, 1991, pp. 71-72, 4B-8.

Miller G., et al., "Bounds on the maximum likelihood decoding error probability of low density parity check codes", Information Theory, 2000. Proceedings. IEEE International Symposium on, 2000, p. 290.

Muramatsu J., et al., "Low density parity check matrices for coding of multiple access networks", Information Theory Workshop, 2003. Proceedings. 2003 IEEE , Apr. 4, 2003, pp. 304-307.

Qualcomm Incorporated: "RaptorQ Technical Overview", pp. 1-12, Oct. 1, 2010.

Samukawa, H. "Blocked Algorithm for LU Decomposition" Journal of the Information Processing Society of Japan, Mar. 15, 1993, vol. 34, No. 3, pp. 398-408.

Taiwan Search Report—TW100124836—TIPO—Oct. 17, 2013.

3GPP TSG-SA4 #57 S4-100015, IMS based PSS and MBMS User Service extensions, Jan. 19, 2010, URL: http://www.3gpp.org/ftp/tsg_sa/WG4_CODEC/TSGS4_57/docs/S4-100015.zip.

3rd Generation Partnership Project; Technical Specification Group Services and System Aspects; Transparent end-to-end Packet-switched Streaming Service (PSS); Protocols and codecs(Release 9) 3GPP TS 26.234 V9.3.0, Jun. 23, 2010 P.85-102, URL, http://www.3gpp.org/ftp/TSG_SA/WG4_CODEC/TSGS4_59/Docs/S4-100511.zip, 26234-930.zip.

Lee, J.Y., "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.

Luby M., "Simple Forward Error Correction (FEC) Schemes," draft-luby-rmt-bb-fec-supp-simple-00.txt, pp. 1-14, Jun. 2004.

Luby M., "LT Codes", Foundations of Computer Science, 2002, Proceedings, The 43rd Annual IEEE Symposium on, 2002.

Morioka S., "A Verification Methodology for Error Correction Circuits over Galois Fields", Tokyo Research Laboratory, IBM Japan Ltd, pp. 275-280, Apr. 22-23, 2002.

Qualcomm Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WG4_CODEC/Ad-hoc_MBS/Docs_AHI/S4-AHI170.zip, S4-AH170_CR_AdaptiveHTTPStreaming-Full.doc.

Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Rel-9.doc.

Gerard X., "HTTP Streaming MPEG media—Response to CFP", 93. MPEG Meeting, Geneva Jul. 26, 2010 to Jul. 30, 2010.

* cited by examiner

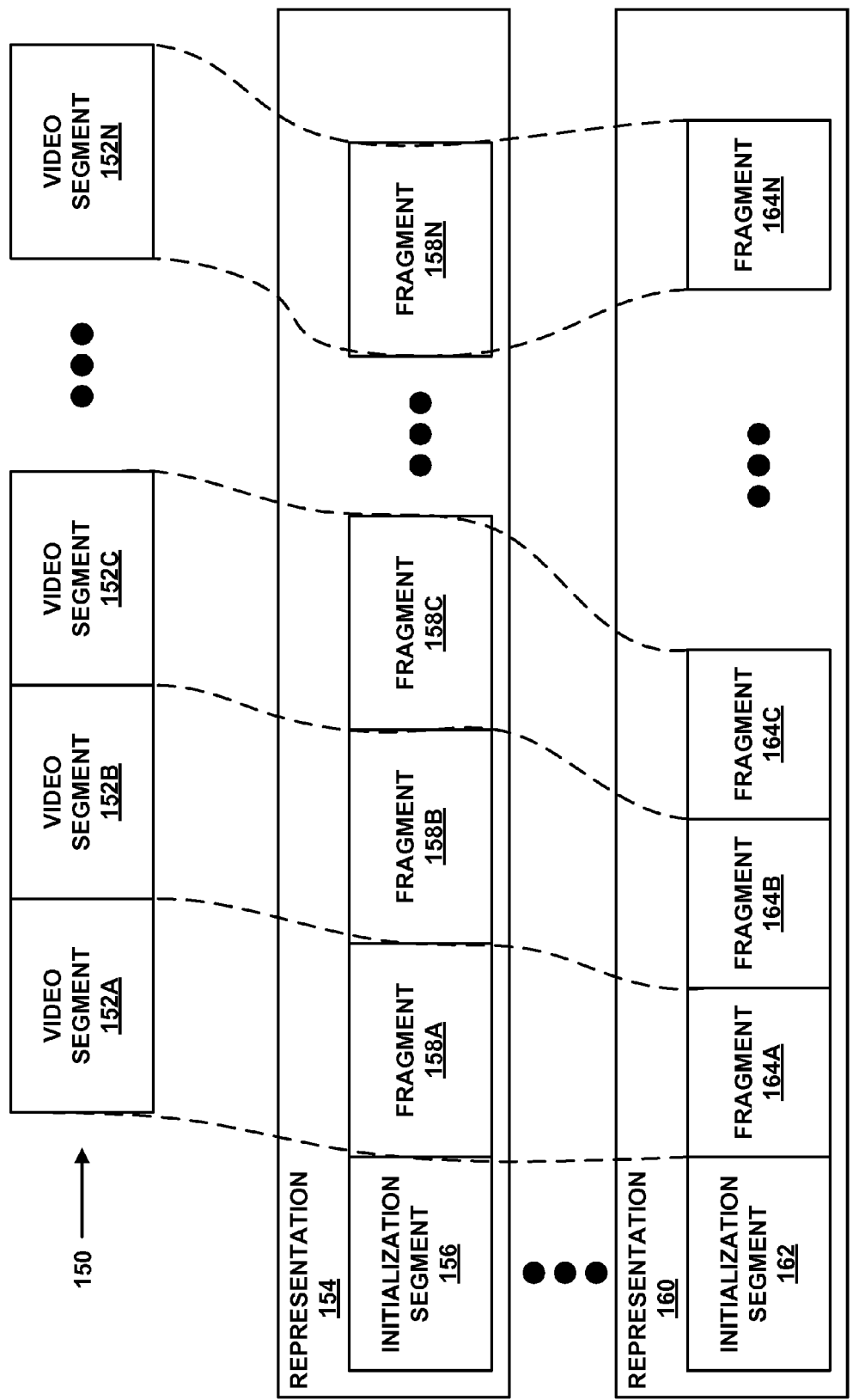

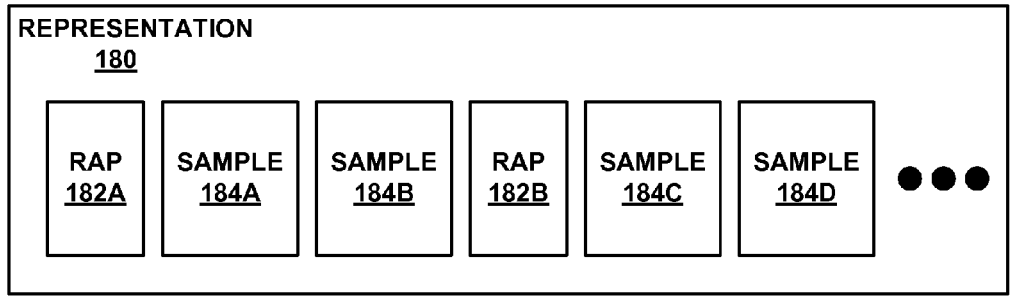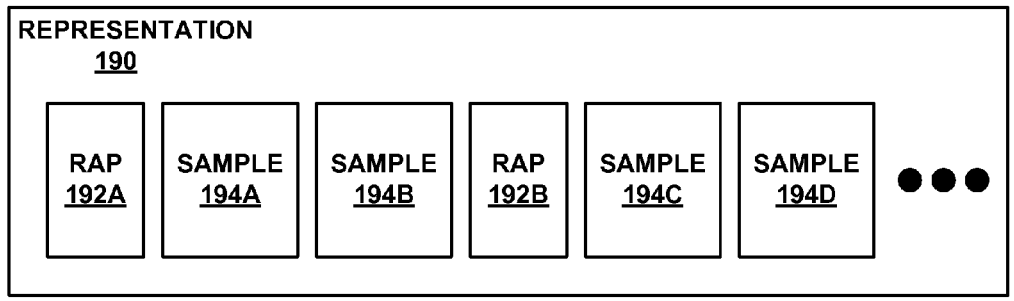
FIG. 5A
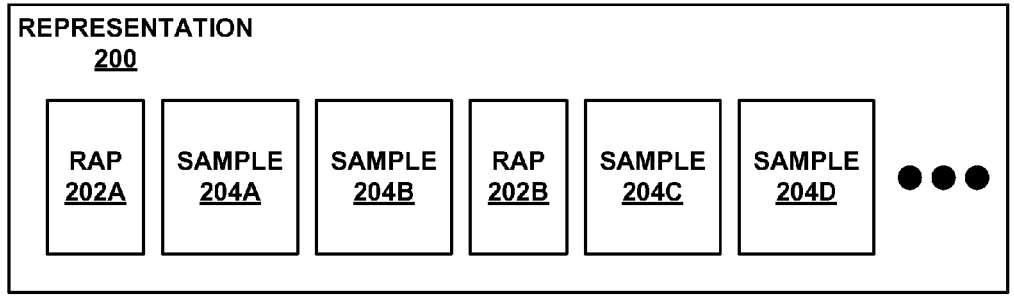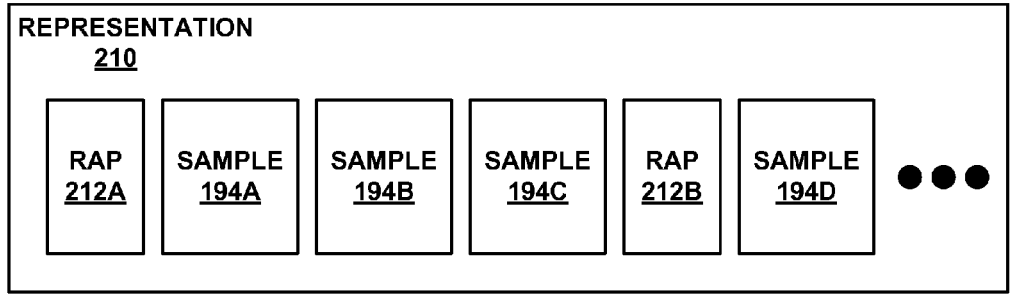
FIG. 5B

VIDEO SWITCHING FOR STREAMING VIDEO DATA

This application claims the benefit of U.S. Provisional Application No. 61/363,884, filed Jul. 13, 2010, U.S. Provisional Application No. 61/366,436, filed Jul. 21, 2010, U.S. Provisional Application No. 61/374,222, filed Aug. 16, 2010, and U.S. Provisional Application No. 61/433,110 filed Jan. 14, 2011, each of which is hereby incorporated by reference in its entirety.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

Efforts have been made to develop new video coding standards based on H.264/AVC. One such standard is the scalable video coding (SVC) standard, which is the scalable extension to H.264/AVC. Another standard is the multi-view video coding (MVC), which has become the multiview extension to H.264/AVC. A joint draft of MVC is in described in JVT-AB204, "Joint Draft 8.0 on Multiview Video Coding," 28$^{th}$ JVT meeting, Hannover, Germany, July 2008, available at http://wftp3.itu.int/av-arch/jvt-site/2008_07_Hannover/JVT-AB204.zip. A version of the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009," available from http://wftp3.itu.int/av-arch/jvt-site/2009_01_Geneva/JVT-AD007.zip. This document provides an integration of the SVC and MVC standards with the AVC specification.

SUMMARY

In general, this disclosure describes techniques for switching between representations of multimedia content while streaming the representations using a network streaming protocol. The same multimedia content may be encoded in a variety of ways, resulting in various representations of the multimedia content. The techniques of this disclosure may improve streaming of data for the multimedia content (e.g., according to a network streaming protocol such as HTTP version 1.1, also referred to as HTTP streaming) by improving a client device's ability to switch between representations without interrupting video playback at the client device.

In accordance with the techniques of this disclosure, a server device may signal (that is, provide in response to a request) a delay value representing decoding delay and picture reordering delay. Decoding delay may represent an amount of time required to decode one or more encoded video samples of a representation. Picture reordering delay may represent an amount of time required to reorder pictures for display purposes, as the pictures are not necessarily displayed in the same order that they are decoded. The client device may use the delay value to determine a point at which the client device may switch from one representation to another. That is, the client device may determine a point at which the client device stops requesting data of a first representation and instead begins requesting data for a second, different representation. Taking account of the signaled delay value, the client may determine this point such that playback (following decoding and reordering) is not interrupted by the switch between representations.

In one example, a method of sending video data includes providing information to a client device for accessing data for a first representation of a video sequence and a second representation of the video sequence; providing information to the client device indicating that the client device can, during transmission of the data for the first representation, switch to the second representation without experiencing a presentation gap when displaying the video sequence and without simultaneously executing more than one decoder to decode the data for the first representation and the second representation during the switch, in response to a first request from the client device to retrieve data from the first representation, sending the requested data from the first representation to the client device, and, in response to a second request from the client device to retrieve data from the second representation after sending the requested data from the first representation, sending the requested data from the second representation to the client device.

In another example, an apparatus for sending video data includes a processor configured to provide information to a client device for accessing data for a first representation of a video sequence and a second representation of the video sequence, provide information to the client device indicating that the client device can, during transmission of the data for the first representation, switch to the second representation without experiencing a presentation gap when displaying the video sequence and without simultaneously executing more than one decoder to decode the data for the first representation and the second representation during the switch, in response to a first request from the client device to retrieve data from the first representation, send the requested data from the first representation to the client device, and, in response to a second request from the client device to retrieve data from the second representation after sending the requested data from the first representation, send the requested data from the second representation to the client device.

In another example, an apparatus for sending video data includes means for providing information to a client device for accessing data for a first representation of a video sequence and a second representation of the video sequence, means for providing information to the client device indicating that the client device can, during transmission of the data for the first representation, switch to the second representation without experiencing a presentation gap when displaying the video sequence and without simultaneously executing more than one decoder to decode the data for the first representation and the second representation during the switch, means for, in response to a first request from the client device to retrieve data from the first representation, sending the requested data from the first representation to the client device, and means for, in response to a second request from the client device to retrieve data from the second representation after sending the requested data from the first representation, sending the requested data from the second representation to the client device.

In another example, a computer program product includes a computer-readable storage medium comprises instructions that, when executed, cause a processor of a source device for sending video data to provide information to a client device for accessing data for a first representation of a video sequence and a second representation of the video sequence, provide information to the client device indicating that the client device can, during transmission of the data for the first representation, switch to the second representation without experiencing a presentation gap when displaying the video sequence and without simultaneously executing more than one decoder to decode the data for the first representation and the second representation during the switch, in response to a first request from the client device to retrieve data from the first representation, send the requested data from the first representation to the client device, and, in response to a second request from the client device to retrieve data from the second representation after sending the requested data from the first representation, send the requested data from the second representation to the client device.

In another example, a method of receiving video data includes receiving a delay value indicative of a delay for switching between a first representation of a video sequence and a second representation of the video sequence, requesting data from the first representation of a video sequence in accordance with a streaming network protocol, in response to determining to switch from the first representation to the second representation, buffering an amount of data from the first representation based on the delay value, and, after buffering the amount of data from the first representation, requesting data from a second representation of the video sequence in accordance with the streaming network protocol.

In another example, an apparatus for receiving video data includes a processor configured to receive a delay value indicative of a delay for switching between a first representation of a video sequence and a second representation of the video sequence, request data from the first representation of a video sequence in accordance with a streaming network protocol, in response to determining to switch from the first representation to the second representation, buffer an amount of data from the first representation based on the delay value, and, after buffering the amount of data from the first representation, request data from a second representation of the video sequence in accordance with the streaming network protocol.

In another example, an apparatus for receiving video data includes means for receiving a delay value indicative of a delay for switching between a first representation of a video sequence and a second representation of the video sequence, means for requesting data from the first representation of a video sequence in accordance with a streaming network protocol, means for in response to determining to switch from the first representation to the second representation, buffering an amount of data from the first representation based on the delay value, and means for requesting, after buffering the amount of data from the first representation, data from a second representation of the video sequence in accordance with the streaming network protocol.

In another example, a computer program product includes a computer-readable storage medium comprises instructions that cause a processor of a destination device for receiving video data to receive a delay value indicative of a delay for switching between a first representation of a video sequence and a second representation of the video sequence, request data from the first representation of a video sequence in accordance with a streaming network protocol, in response to determining to switch from the first representation to the second representation, buffer an amount of data from the first representation based on the delay value, and after buffering the amount of data from the first representation, request data from a second representation of the video sequence in accordance with the streaming network protocol.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a conceptual diagram illustrating switchable representations.

FIG. 5A is a conceptual diagram illustrating an example of two representations that are timely aligned.

FIG. 5B is a conceptual diagram illustrating an example of two representations that are not timely aligned.

DETAILED DESCRIPTION

Figure 1:
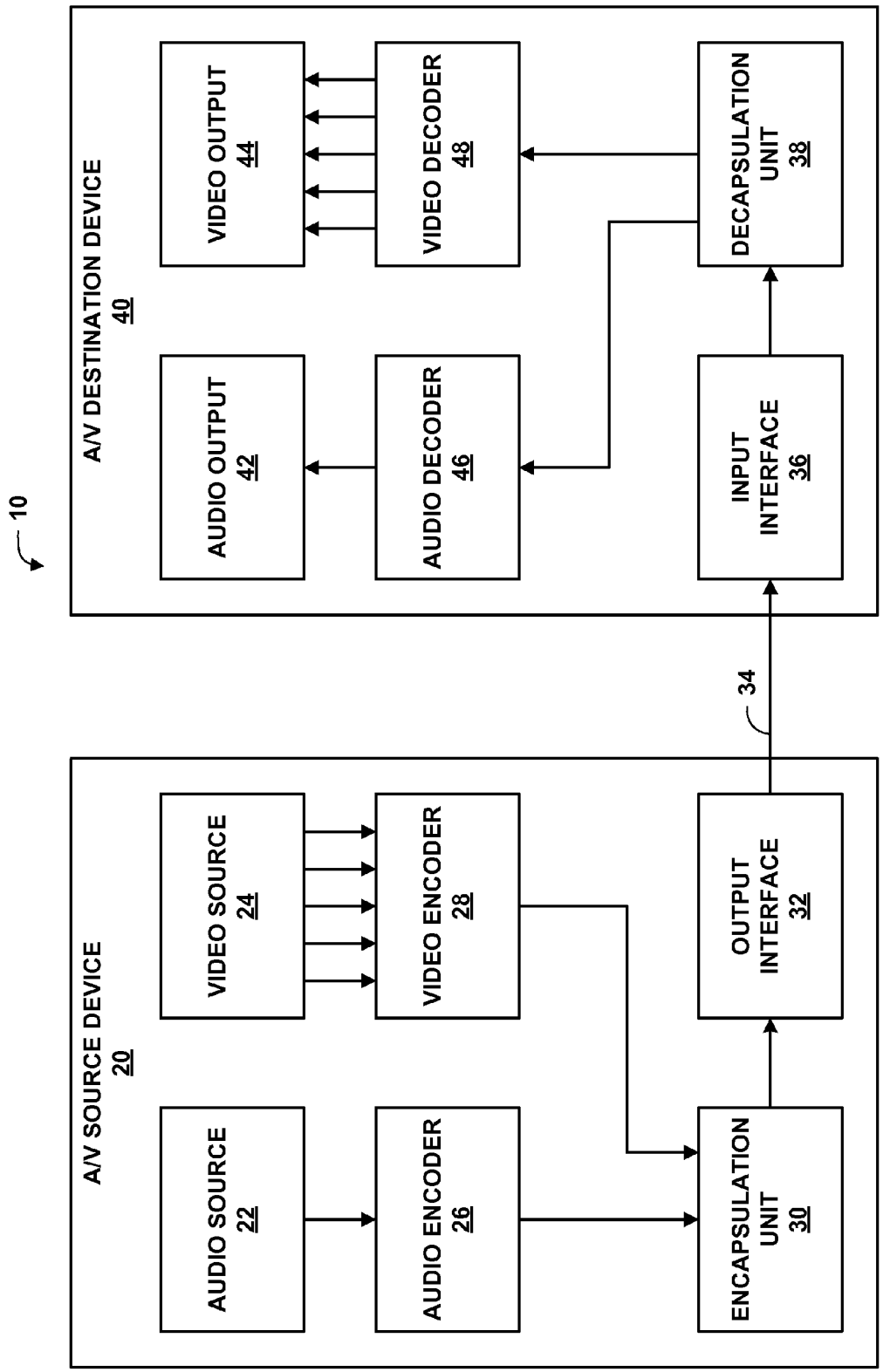
FIG. 1 is a block diagram illustrating an example system in which an audio/video (A/V) source device transfers audio and video data to an A/V destination device.

In general, this disclosure describes techniques for supporting switching between representations of multimedia content in a network streaming context. There may be natural delay when switching between representations, caused by a variety of factors. As explained in greater detail below, the techniques of this disclosure include signaling (e.g., a server device providing data in response to a request from a client device) information indicative of a delay to account for when switching from one representation of multimedia content to another representation of the multimedia content. In this manner, the client device may buffer a sufficient amount of data from the first representation to allow for decoding of the data before receiving data from the second representation and beginning to decode the data from the second representation. Accordingly, the client device may be capable of switching between representations without interrupting playback of the multimedia content. In this manner, the techniques of this disclosure may improve a user's experience when viewing the content on the client device.

The signaled delay may represent both decoding delay and picture reordering delay. In particular, the signaled delay value may comprise a combination of a maximum decoding delay and a maximum reordering delay for switching from one representation to another. There may be different decoding delays associated with a sequence of pictures, e.g., based on an encoding mode, a bitrate, a resolution, or other factors of each frame. The signaled delay value may include a maximum decoding delay of any access unit of any representation, or any access unit of the two representations involved in the switch.

The picture reordering delay may correspond to a delay associated with reordering pictures from decoding to display order. In the example of H.264/AVC, a bitstream may include various types of coded pictures, e.g., intra-coded pictures (e.g., I-pictures) and inter-coded pictures (e.g., P-pictures and B-pictures). Data for an I-picture are generally coded relative only to other data of the I-picture, and thus, are intra-picture coded. Data for P- and B-pictures may be coded relative to one or more other previously coded pictures. A P-picture, for example, may be coded relative to one or more pictures preceding the P-picture in display order. A B-picture, as another example, may be coded relative to one or more pictures preceding the B-picture in display order and one or more pictures following the B-picture in display order. Pictures used for reference may be encoded and placed earlier in the bitstream than the pictures making reference to those pictures.

As one example, a B-picture may be encoded relative to both an I-picture and a P-picture, and the P-picture may be encoded relative to the I-picture. Of the three pictures, the P-picture may have the earliest display time, the I-picture may have the latest display time, and the B-picture may have a display time between that of the P-picture and the I-picture. Due to the prediction structure of these pictures, a video encoder may place the I-picture earliest of the three pictures in the bitstream, place the B-picture latest of the three pictures in the bitstream, and place the P-picture between the I-picture and the B-picture in the bitstream. Accordingly, a decoder may decode the bitstream in order, that is, decode the I-picture, then the P-picture, and then the B-picture. However, the decoder may reorder the pictures into display order such that the P-picture is displayed before the B-picture, and the B-picture is displayed before the I-picture.

As discussed above, the signaled delay value may include a combination of a decoding delay and a picture reordering delay. The picture reordering delay may correspond to a maximum difference between a presentation time and a decoding time for any picture in any representation. In some examples, the picture reordering delay may correspond to the maximum difference between presentation time and decoding time for any picture in the two representations involved in the switch. Presentation time corresponds to a relative time at which a picture is displayed, while decoding time corresponds to a relative time at which the picture is decoded. As noted above, presentation time and decoding time are not necessarily equal, and therefore, following decoding, decoded pictures may be reordered into presentation time ordering.

A server device may signal to a client device a delay value for seamless switching. The delay value may comprise the sum of the maximum decoding delay of any picture in any representation and the maximum difference between presentation time and decoding time of any picture in any representation of the same multimedia content. The client device may use this signaled delay value to perform a seamless switch between two representations. For example, the client device may determine an amount of data to have buffered in the current representation before switching to a different representation, such that seamless switching can be effected. That is, the client device may have smooth playback and seamless decoding, assuming that the available bandwidth is sufficient for the new representation.

To effect seamless switching, a client device may need to provide both seamless decoding during a switch between representations, as well as seamless display of decoded pictures. Seamless decoding may ensure that a second decoder is not needed to decode pictures from the new representation (although a client device may nevertheless include more than one decoder). Seamless displaying may correspond to having pictures ready for continuous playback during a switch between the representations.

The techniques of this disclosure also include forming switch groups from a set of representations, and signaling that a set of representations belong to the same switch group. A representation may include an initialization segment, which includes data for initializing a decoder and/or other elements of a destination device. The initialization segment may describe, for example, the movie box of a ISO base media file, the samples containing the sequence parameter set and picture parameter set, of the H.264/AVC bitstreams, and possibly sequence level supplemental enhancement information (SEI) messages. In some cases, the same initialization segment may be used to initialize the destination device for more than one representation. A switch group may include a set of representations that may each be initialized using the same initialization segment. In this manner, a client device may retrieve an initialization segment for a first representation of a switch group, then switch to a second representation of the switch group without retrieving an initialization segment specific to the second representation. That is, the client device may use the initialization segment for the first representation to decode the second representation. A switch group may include the representations which have timely aligned segments thus switching from one representation to another, when the segments all start with a random access point picture. In this case, on timely overlapped segments of different representations need to be requested, if switching between such the group happens.

In general, an I-picture may be referred to as a random access point (RAP). That is, a decoder may begin decoding video data starting at the I-picture and be capable of decoding some, if not all, of the pictures in the bitstream following the I-picture. There may be some pictures that are not correctly decodable, however, such as B-pictures having a display order that is earlier than the I-picture but a decoding order that is later than the I-picture. These B-pictures may depend from an earlier I-picture in the bitstream. An I-picture for which all subsequent pictures in the bitstream can be properly decoded without retrieving earlier pictures in the bitstream may be referred to as an instantaneous decoding refresh (IDR) random access point. An I-picture for which at least one subsequent picture in the bitstream cannot be properly decoded without retrieving earlier pictures in the bitstream may be referred to as an open decoding refresh (ODR) random access point.

Stated another way, an IDR picture may contain only intra-coded slices and may cause all reference pictures except for the IDR picture to be marked as "unused for reference." A coded video sequence may be defined as a sequence of consecutive access units in decoding order from an IDR access unit, inclusive, to the next IDR access unit, exclusive, or to the end of the bitstream, whichever appears earlier. Each picture in a group of pictures (GOP) including an IDR picture can be properly decoded regardless of whether any previous pictures were decoded. Such a GOP may be referred to as a closed GOP. That is, a closed GOP is a GOP in which all pictures can be properly decoded, assuming all pictures of the GOP are available for decoding. In the example of H.264/AVC, a closed GOP may start from an IDR access unit, that is, an access unit including an IDR picture. Moreover, each picture in a coded video sequence can be properly decoded, assuming that each picture of the coded video sequence is available for decoding (including the initial IDR picture).

An open GOP may be defined as a group of pictures in which pictures preceding an I-picture of the GOP in display order are not correctly decodable, even when all pictures of the open GOP are available for decoding. An encoder may include information in the bitstream indicating that a GOP is an open GOP, such as a recovery point supplemental enhancement information (SEI) message. An I-picture of an open GOP may be referred to as an ODR picture. Although pictures following the open GOP in decoding order may be correctly decodable, certain pictures in the open GOP may refer to a previous I-picture in decoding order, and thus not be properly decodable unless that previous I-picture is available for decoding.

Generally, the decoder may begin decoding a bitstream starting from an IDR or ODR picture, and thus treat both IDR and ODR pictures as random access points within the bitstream. However, because there are some pictures following an ODR picture in the bitstream that are not properly decodable if the bitstream is accessed starting at the ODR picture, the decoder may exert unnecessary effort in attempting to decode these pictures. In accordance with the techniques of this disclosure, a server may signal whether a random access point picture is an IDR or ODR picture. The server may also signal byte ranges for the random access points, such that a client device may submit one or more HTTP partial GET requests to access only the IDR and/or ODR pictures. In this manner, the client may retrieve the IDR and/or ODR pictures to enable a trick mode display of the multimedia content, such as fast forward or rewind.

The techniques of this disclosure may be applied to video files conforming to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A representation (motion sequence) may be contained in several files. Timing and framing (position and size) information is generally in the ISO base media file and the ancillary files may essentially use any format. This representation may be 'local' to the system containing the representation, or may be provided via a network or other stream delivery mechanism.

The files may have a logical structure, a time structure, and a physical structure, and these structures are not required to be coupled. The logical structure of the file may be of a movie or video clip (potentially including both video and audio data) that in turn contains a set of time-parallel tracks. The time structure of the file may be that the tracks contain sequences of samples in time, and those sequences are mapped into the timeline of the overall movie by optional edit lists. The physical structure of the file may separate the data needed for logical, time, and structural de-composition, from the media data samples themselves. This structural information may be concentrated in a movie box, possibly extended in time by movie fragment boxes. The movie box may document the logical and timing relationships of the samples, and may also contain pointers to where they are located. Those pointers may be into the same file or another one, e.g., referenced by a URL.

Each media stream may be contained in a track specialized for that media type (audio, video etc.), and may further be parameterized by a sample entry. The sample entry may contain the 'name' of the exact media type (the type of decoder needed to decode the stream) and any parameterization of that decoder needed. The name may also take the form of a four-character code, e.g., "moov," or "trak." There are defined sample entry formats not only for MPEG-4 media, but also for the media types used by other organizations using this file format family.

Support for meta-data generally takes two forms. First, timed meta-data may be stored in an appropriate track, and synchronized as desired with the media data it is describing. Secondly, there may be general support for non-timed meta-data attached to the movie or to an individual track. The structural support for meta-data is general, and allows the storage of meta-data resources elsewhere in the file or in another file, in a manner similar to the storage of the media data, that is, the coded video pictures. In addition, these resources may be named, and may be protected.

The term "progressive download" is used to describe the transfer of digital media files from a server to a client, typically using the HTTP protocol, e.g., version 1.1 of HTTP. One example of progressive download is HTTP streaming. When initiated from a computer, the computer may begin playback of the media before the download is complete. One difference between streaming media and progressive download is in how the digital media data is received and stored by the end user device that is accessing the digital media. A media player that is capable of progressive download playback relies on metadata located in the header of the file to be intact and a local buffer of the digital media file as it is downloaded from a web server. At the point at which a specified amount of buffered data becomes available to the local playback device, the device may begin to play the media. This specified amount of buffered data may be embedded into the file by the producer of the content in the encoder settings and may be reinforced by additional buffer settings imposed by the media player of the client computer.

In HTTP streaming, rather than providing all data for a representation, including encoded audio and video samples, in the movie (MOOV) box, movie fragments (MOOF boxes) are supported, which may contain samples separately from the movie box. Each movie fragment may contain samples for a certain period of time. In general, a client may quickly seek to a desired time using the movie fragments. A movie fragment may contain continuous bytes of a file, such that in HTTP streaming (for example), a client may issue a single partial GET request to retrieve a movie fragment. A partial GET request specifies an identifier (e.g., uniform resource locator (URL) or uniform resource name (URN)) of a file, as well as a byte range within the file, to be retrieved. In some examples, the encoded audio and video samples may be contained entirely in movie fragments, such that the movie box itself does not contain any encoded audio or video samples.

AVC and 3GPP are extensions of the ISO base media file format, while SVC and MVC are extensions of the AVC file format. Accordingly, the techniques of this disclosure may be applied with respect to video files conforming to the ISO base media file format, the AVC file format and extensions thereof, e.g., SVC and MVC, and/or the 3GPP file format. The techniques may further be applied to these and other extensions of these formats, and may further be applied to extend other file formats to provide information describing switchable representations, and delay values to allow seamless switching between two or more representations.

The Motion Pictures Experts Group (MPEG) has developed an AVC file format, as an extension of the ISO base media file format. In the AVC file format, parameter sets, including the sequence parameter set and the picture parameter sets can be associated with the video elementary stream, which is the in the video track. It is also possible to have the parameter sets in another track, called a parameter set track, which includes the parameter set elementary stream containing the samples that are the SPS or PPS network abstraction layer (NAL) units. The location of SEI message NAL units, however, is not restricted in the AVC file format, as long as any SEI message is presented in a sample with a decoding time prior to any picture that uses this SEI message.

AVC file format is extended by the SVC and MVC extensions, to support the storage of SVC and MVC, respectively. In SVC and MVC, multiple layers/views can be contained in one video track or multiple video tracks. There are tools defined in the SVC and MVC specifications to construct operation points when the layers/views are presented in various organizations.

With respect to 3GPP as another example, HTTP/TCP/IP transport is supported for 3GPP files for download and progressive download. Furthermore, using HTTP for video streaming may provide some advantages, and the video streaming services based on HTTP are becoming popular. HTTP streaming may provide certain advantages, including that existing Internet components and protocols may be used, such that new efforts are not needed to develop new techniques for transporting video data over a network. Other transport protocols, e.g., RTP payload format, require intermediate network devices, e.g., middle boxes, to be aware of the media format and the signaling context. Also, HTTP streaming can be client-driven, which may avoid control issues.

For example, to exploit features to obtain optimal performance, the server may keep track of the size and content of packets which are not yet acknowledged. The server may also analyze the file structure and reconstruct the state of the client buffer to make RD-optimal switching/thinning decisions. In addition, constraints on the bit stream variations may be satisfied in order to stay compliant with negotiated profiles. HTTP does not necessarily require new hardware or software implementations at a Web server that has HTTP 1.1 implemented. HTTP streaming also provides TCP-friendliness and firewall traversal.

The techniques of this disclosure may be applicable to network streaming protocols, such as HTTP streaming, e.g., in accordance with dynamic adaptive streaming over HTTP (DASH). In HTTP streaming, frequently used operations include GET and partial GET. The GET operation retrieves a whole file associated a given uniform resource locator (URL) or uniform resource name (URN). The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media representation may be a structured collection of data that is accessible to the client. The client may request and download media data information to present a streaming service to a user.

In the example of streaming 3GPP data using HTTP streaming, there may be multiple representations for video and/or audio data of multimedia content. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Each representation may also include one or more media components, where each media component may correspond to an encoded version of one individual media type, such as audio, vide, or timed text (e.g., for closed captioning). Media components may be time-continuous across boundaries of consecutive media segments within one representation.

The MPD may also support partial representations, e.g., by providing a group attribute. A partial representation may correspond to a video or audio track of a multimedia file. The MPD may indicate that two partial representations have the same group attribute when the two partial representations are switchable to each other.

The server device may also signal whether two representations are efficiently switchable to each other. Two representations may be considered efficiently switchable if the initialization segment of either of the representations may be used when decoding the other representation. That is, a client device may receive an initialization segment for a current representation, then switch to a new representation without requesting an initialization segment for the new representation.

The server device may set a flag in an MPD data structure indicating whether a representation is a partial representation or not. For example, the MPD data structure may include a switch identifier for each representation. The server device may set the switch identifiers of two or more efficiently switchable representations to the same value. In this manner, a client device may determine a set of representations that are efficiently switchable to each other based on each of the representations having the same switch identifier. The server may further indicate, in the MPD, whether segments of the representations are timely aligned.

The MPD may also contain a minBufferTime attribute, which indicates a minimum amount of initially buffered media needed to ensure smooth playout, provided that each representation is delivered at or above the value of a bandwidth attribute of the MPD. In this manner, a client device may determine how much media to buffer before beginning playback, assuming a certain amount of available bandwidth. The client may further select representations based on the amount of available bandwidth, e.g., initially or when network conditions change, based on the bandwidth attribute. These attributes may provide a simple buffer model in a solution to enable continuous decoding and presentation of content under various network conditions.

In each period, representations may be switchable to each other. The MPD may provide a bitstreamSwitchingFlag attribute. When this flag is true, it indicates that the result of splicing on a bitstream level of any two time-sequential media segments within a period from any two different representations containing the same media types complies with the media segment format. When this flag is true, all bitstreams may be assumed to be timely aligned and to have the same profile and level indicators, and that many sequence parameters are the same (in the example of H.264/AVC coding).

During streaming and playback, a client device may switch between representations. For example, the client device may determine that network conditions have changed such that available bandwidth has either increased or decreased. When bandwidth has increased, the client device may switch to a higher quality representation, assuming the client device is capable of decoding and rendering the data of the higher quality representation. On the other hand, when bandwidth has decreased, the client device may switch to a lower quality representation that consumes less bandwidth. In general, based upon updated information during an ongoing media presentation, a client device may switch representations. Switching to a new representation may include procedures similar to beginning to retrieve or seeking to a particular position within a representation from the time point (e.g., the temporal location) where the previous representation was stopped.

After determining that a switch to a new representation is appropriate, the client device may begin streaming the new representation starting at a random access point. That is, the client device may seek to a random access point in the new representation at a desired presentation time that is later than, but close to, the current presentation time. By presenting data from the previous representation up to the random access point, then presenting data from the new representation at and following the random access point, the client device may achieve seamless switching. In accordance with the techniques of this disclosure, the client device may use a signaled delay time to determine a random access point of the new representation from which to begin streaming data of the new representation. The server device may signal the delay time in the MPD data structure for a media content. In some examples, a source device may align random access points across different representations, which may provide advantages in locating random access points in the representations.

In some cases, two switchable representations may not be time-aligned. For example, random access points in the two representations may occur at different temporal positions. In such a case, the server may set a flag or provide other information to indicate that the two representations are not aligned. In such a case, switching from one representation to the other may be difficult. For example, the end of the fragment in the current representation and the frames starting at the random access point in the new fragment of the switched-to representation may have a display time overlap. This disclosure also provides techniques for seamlessly switching between two non-aligned representations. In particular, a client device and/or a server device may introduce additional delay, to cause the client device to continue retrieving data from the current representation before switching to the new representation at a random access point. This delay may depend on the GOP structure of the current representation as well as the location of the picture in the GOP.

In accordance with the techniques of this disclosure, the server device may signal an overlap delay value representative of the difference between a temporal position of a non-random access point picture in one representation and a temporal position of a random access point picture in another representation. The server device may signal the overlap delay value in an MPD for the representations. In some examples, the server device may signal the maximum overlap delay value of each representation for a whole period, or even for a whole service. In some examples, the server device may signal a maximum delay value as the sum of overlap delay and the delay value discussed above for fragments that are aligned. Thus, the server device may signal a single delay value that may include the sum of a maximum decoding delay, a maximum picture reordering delay, and a maximum overlap delay for two or more switchable representations.

The server device may further signal a minimum delay value for a representation. Assuming that the representation is delivered at or above the value of its bandwidth attribute, the client device may be assured of smooth playout of the representation if sufficient data is buffered to cover the minimum delay. The server device may be configured to modify the calculation of a minimum buffer time value to cover the case of seamless switching. The minimum buffer time value (minBufferTime) may provide the minimum amount of initially buffered media that is needed to ensure smooth playout and seamless switching, provided that each Representation is delivered at or above the value of its bandwidth attribute. In this manner, the minimum buffer time value may correspond to a simple buffer model in a solution to enable continuous decoding and presentation of content under various network conditions.

In general, a user of a client device may pause or stop a media presentation during playback. When the user pauses or stops the presentation, the client device may stop requesting media segments or portions thereof, until the user resumes playback. To resume, the client device may request media segments starting with the fragment immediately following the last requested fragment. The MPD for any specific representation may provide a TrickMode element for the representation, in which case the representation can be assumed to be explicitly enabled for use with trick modes. Trick modes generally include fast forward and rewind modes, or other such modes in which playback is altered relative to the "normal" playback. The MPD may provide an alternatePlayoutRate attribute, in which case the client device may play the representation with speeds corresponding to the alternatePlayoutRate, with the same decoder profile and level as the normal playout rate. The client device may also use multiple representations to support trick mode behavior.

FIG. 1 is a block diagram illustrating an example system 10 in which audio/video (A/V) source device 20 transports audio and video data to A/V destination device 40. System 10 of FIG. 1 may correspond to a video teleconference system, a server/client system, a broadcaster/receiver system, or any other system in which video data is sent from a source device, such as A/V source device 20, to a destination device, such as A/V destination device 40. In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

In general, source device 20 may act as a server of encoded video content. Video encoder 28 may encode the same video content in different ways, e.g., using different encoding standards and/or encoding at different bit rates, frame rates, or versions (e.g., two-dimensional or three-dimensional). Thus, the same video content may be available in a variety of different representations. Source device 20 may advertise the availability of different representations of the video content. Destination device 40 may be capable of selecting one of the representations, e.g., based on characteristics of the representations and decoding and rendering capabilities of destination device 40, as well as current network conditions, e.g., available bandwidth.

Source device 20 may generally act as a server, e.g., in accordance with HTTP version 1.1. Thus, source device 20 may provide data for a representation to destination device 40 in accordance with streaming network protocols and network-based streaming standards, such as the DASH standard. In some cases, as discussed in greater detail below, representations may be switchable. That is, destination device 40 may begin retrieving data of one representation, then switch to a different representation mid-stream. In accordance with the techniques of this disclosure, destination device 40 may seamlessly switch between two representations, without needing to decode two representations in parallel and without encountering gaps in playback.

Audio source 22 and video source 24 may capture raw audio and video data. Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the storage and transport of encoded multimedia (e.g., audio and video) data, and reception and subsequent interpretation and decoding of the transported multimedia data. As shown in the example of FIG. 1, video source 24 may provide a plurality of views of a scene to video encoder 28.

Each individual stream of data (whether audio or video) is referred to as an elementary stream. An elementary stream is a single, digitally coded (possibly compressed) component of a program. For example, the coded video or audio part of the program can be an elementary stream. An elementary stream may be converted into a packetized elementary stream (PES) before being encapsulated within a video file. Within the same program, a stream ID is used to distinguish the PES-packets belonging to one elementary stream from the other. The basic unit of data of an elementary stream is a packetized elementary stream (PES) packet. Thus, each view of MVC video data corresponds to respective elementary streams. Similarly, audio data corresponds to one or more respective elementary streams.

In the example of FIG. 1, encapsulation unit 30 receives elementary streams comprising video data from video encoder 28 and elementary streams comprising audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

A representation, as that term is used in this disclosure, may include a combination of audio data and video data, e.g., an audio elementary stream and a video elementary stream delivered by A/V source device 20. Multimedia content may have one or more representations, e.g., when video data is encoded at different frame rates, different bit rates, or different resolutions. Similarly, audio data for multimedia content may correspond to various languages, e.g., English, French, and Chinese. A representation may correspond to a selection of an audio elementary stream and one or more video elementary streams (e.g., to support three-dimensional video data).

Encapsulation unit 30 receives PES packets for elementary streams of a program from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may correspond to data generated by the core compression engine, and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

In accordance with the techniques of this disclosure, encapsulation unit 30 may signal that two or more representations are efficiently switchable to each other. Encapsulation unit 30 may, for example, determine whether initialization segments of the two or more representations can be used interchangeably to decode and/or render encoded samples of the representations. Encapsulation unit 30 may generate data used to indicate whether representations are efficiently switchable to each other. Accordingly, destination device 40 may request the data, e.g., in order to switch from one representation to another during streaming.

Encapsulation unit 30 may also calculate a delay value representative of a maximum delay when switching between two efficiently switchable representations. That is, the delay value may generally represent an amount of delay that can be expected (assuming a constant bandwidth availability) when switching between two representations. Accordingly, encapsulation unit 30 may calculate the delay value as the sum of a maximum decoding delay and a maximum picture reordering delay, when the representations are timely aligned. When the representations are not timely aligned, e.g., when random access points occur at different temporal locations within the representations, encapsulation unit 30 may further calculate an overlap delay and include the overlap delay in the calculated delay value. Source device 20 may provide the delay value to destination device 40, e.g., in response to a request for the delay value from destination device 40.

Destination device 40 may be configured to retrieve and buffer a sufficient amount of data of a representation, based on the delay value, in order to perform seamless switching between two representations. Accordingly, destination device 40 may buffer a sufficient amount of data that destination device 40 is able to begin requesting data of a different representation, and begin decoding the data of the new representation, without suffering a display gap. That is, while retrieving data from the new representation, destination device 40 may decode and render data from the previous representation. Moreover, destination device 40 may be configured such that simultaneous decoding of two representations is not necessary. That is, after accessing a random access point of the new representation, destination device 40 need not decode data from two or more representations corresponding to the same temporal location in video playback. This may improve battery performance, in that video decoder 48 need not decode multiple samples for the same temporal location.

A NAL unit including video data in its payload may comprise various granularity levels of video data. For example, a NAL unit may comprise a block of video data, a macroblock, a plurality of macroblocks, a slice of video data, or an entire frame of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 second. During this time interval, the specific frames for all views of the same access unit (the same time instance) may be rendered simultaneously. In an example corresponding to H.264/AVC, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

As with most video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

The examples of SVC and MVC provide sequence parameter set (SPS) extensions for scalable video or multiview video. The SPS extension information may be contained in sub-SPS NAL units, which may have a different NAL unit type than the other NAL units. Profile and level information for the supported operation points may be included in NAL units including SPS extension information.

A media representation may include a media presentation description (MPD), which may contain descriptions of different alternative representations (e.g., video services with different qualities) and the description may include, e.g., codec information, a profile value, and a level value. Destination device 40 may retrieve the MPD of a media representation to determine how to access movie fragments of various presentations. Movie fragments may be located in movie fragment boxes (moof boxes) of video files.

Video compression standards such as ITU-T H.261, H.262, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures use only the reference picture before the current picture in temporal order. In a B-picture, each block of the B-picture may be predicted from one or two reference pictures. These reference pictures could be located before or after the current picture in temporal order.

In accordance with the H.264 coding standard, as an example, B-pictures use two lists of previously-coded reference pictures, list 0 and list 1. These two lists can each contain past and/or future coded pictures in temporal order. Blocks in a B-picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination may be used to predict the current block.

The ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Blocks may have different numbers of pixels in the horizontal and vertical dimensions. That is, blocks may include N×M pixels, where N is not necessarily equal to M.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra-(I), or inter-(P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, encapsulation unit 30, and decapsulation unit 38 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, and/or decapsulation unit 38 may comprise an integrated circuit, a microprocessor, and/or a wireless communication device, such as a cellular telephone.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to destination device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Ultimately, input interface 36 retrieves the data from computer-readable medium 34. Input interface 36 may comprise, for example, an optical drive, a magnetic media drive, a USB port, a receiver, a transceiver, or other computer-readable medium interface. Input interface 36 may provide the NAL unit or access unit to decapsulation unit 38. Decapsulation unit 38 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
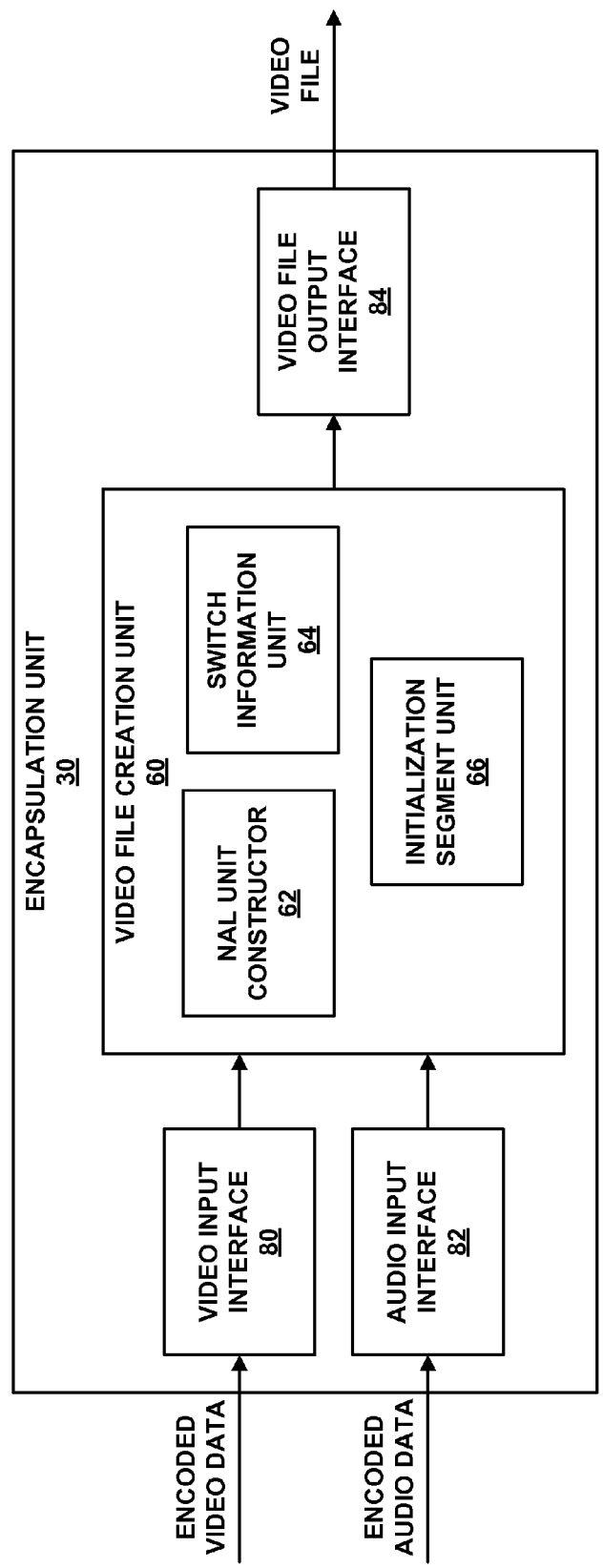
FIG. 2 is a block diagram illustrating components of an example encapsulation unit.

FIG. 2 is a block diagram illustrating components of an example encapsulation unit 30. In the example of FIG. 2, encapsulation unit 30 includes video input interface 80, audio input interface 82, video file creation unit 60, and video file output interface 84. Video file creation unit 60, in this example, includes NAL unit constructor 62, switch information unit 64, and initialization segment unit 66.

Video input interface 80 and audio input interface 82 receive encoded video and audio data, respectively. Video input interface 80 and audio input interface 82 may receive encoded video and audio data as the data is encoded, or may retrieve encoded video and audio data from a computer-readable medium. Upon receiving encoded video and audio data, video input interface 80 and audio input interface 82 pass the encoded video and audio data to video file creation unit 60 for assembly into a video file.

Video file creation unit 60 may correspond to a control unit including hardware, software, and/or firmware configured to perform the functions and procedures attributed thereto. The control unit may further perform the functions attributed to encapsulation unit 30 generally. For examples in which video file creation unit 60 is embodied in software and/or firmware, encapsulation unit 30 may include a computer-readable medium comprising instructions for video file creation unit 60 and a hardware-based processing unit to execute the instructions. Each of the sub-units of video file creation unit 60 (NAL unit constructor 62, switch information unit 64, and initialization segment unit 66, in this example) may be implemented as individual hardware units and/or software modules, and may be functionally integrated or further separated into additional sub-units.

Video file creation unit 60 may correspond to any suitable processing unit or processing circuitry, such as, for example, one or more microprocessors (which may correspond to multiple cores of a single integrated circuit), application-specific integrated circuits (ASICs), field programmable gate arrays (FPGAs), digital signal processors (DSPs), or any combination thereof. Video file creation unit 60 may further include a non-transitory computer-readable medium storing instructions for any or all of NAL unit constructor 62, switch information unit 64, and initialization segment unit 66, as well as a processor for executing the instructions.

In general, video file creation unit 60 may create a video file including the received audio and video data. NAL unit constructor 62 may form NAL units including encoded video and audio samples. Video file creation unit 60 may further be configured to assemble representations including encoded video and audio samples. In some examples, video file creation unit 60 may create multiple representations, which may be switchable to each other, in some examples.

Switch information unit 64 may be configured to generate information for switching between two or more of the representations. For example, switch information unit 64 may be configured to calculate a delay value based on the sum of a maximum decoding delay, a maximum picture reordering delay, and (when the representations are not timely aligned) a maximum overlap delay. Client devices may use the delay value to determine an amount of data of any representation to have buffered in order to seamlessly switch from one representation to another. Thus, the client devices may have a sufficient amount of data buffered to account for delay associated with decoding buffered pictures, reordering the pictures, and to ensure that pictures having a presentation time earlier than a random access point of the new representation can be decoded and rendered during the time that the client device retrieves, decodes, and renders data of the new representation.

Initialization segment unit 66 may generate initialization information for accessing a particular representation. In general, initialization information in an initialization segment does not contain media data. Initialization segment unit 66 may generate initialization segments for each of the representations. However, in some cases, the same initialization segments can be used to initialize multiple representations. When this is true, initialization segment unit 66 may generate information indicating that representations are efficiently switchable. That is, if a first representation and a second representation are efficiently switchable, a client device may retrieve an initialization segment of the first representation, retrieve and decode data of the first representation, then begin retrieving and decoding data of the second representation based on the initialization segment of the first representation, without retrieving an initialization segment of the second representation.

In some examples, video file creation unit 60 may generate a media presentation description (MPD) data structure that describes a media presentation. In accordance with the techniques of this disclosure, video file creation unit 60 may generate a modified MPD data structure that indicates whether two or more representations are efficiently switchable to each other, and a delay value for seamlessly switching between two representations. Table 1 below provides an example MPD data structure in accordance with the techniques of this disclosure. Table 1 is an example in which video file creation unit 60 signals information in the period level. In other examples, the information may be signaled at other levels.

The "Element or Attribute Name" column describes the name of the syntax object. The "Type" column describes whether the syntax object is an element or an attribute. The "Cardinality" column describes the cardinality of the syntax object, that is, the number of instances of the syntax object in an instance of a a data structure corresponding to Table 1. The "Optionality" column describes whether the syntax object is optional, in this example, where "M" indicates mandatory, "O" indicates optional, "OD" indicates optional with a default value, and "CM" indicates conditionally mandatory. The "description" column describes the semantics of the corresponding syntax object.

In this example, video file creation unit 60 may set a single flag (seamlessSwitchingFlag) to indicate whether representations are switchable. If the flag is set to true, a client device may assume that the representations are seamlessly switchable, given that an initial delay is equal to or larger than the minBufferTime signaled in the MPD. When the seamlessSwitchingFlag of this example is set to true, the client device may further assume that no playout gap and no parallel decoding of the representations are needed to perform seamless switching. The client may follow the techniques of this disclosure, e.g., as described with respect to FIG. 8 below, to perform seamless switching.

TABLE 1

| Element or Attribute Name | Type | Cardinality | Optionality | Description |
|---|---|---|---|---|
| MPD | E | 1 | M | The root element that carries the Media Presentation Description for a Media Presentation. |
| type | A | | OD default: OnDemand | "OnDemand" or "Live". Indicates the type of the Media Presentation. Currently, on-demand and live types are defined. If not present, the type of the presentation shall be inferred as OnDemand. |
| ... | | | | |
| minBufferTime | A | | M | Provides the minimum amount of initially buffered media that is needed to ensure smooth playout provided that each Representation is delivered at or above the value of its bandwidth attribute. |
| minBufferSwitching | A | | M | Provides the minimum amount of initially buffered media that is needed to ensure seamless switching between Representations provided that each Representation is delivered at or above the value of its bandwidth attribute. |
| ... | A | | | |
| Period | E | 1...N | M | Provides the information of a Period |
| ... | A | | | ... |
| Representation | E | 1...N | M | May be used to provide information about the original source (for example content provider) of the Media Presentation. |
| ... | A | | | |
| efficientSwitch Group | A | | O Default: False | When present, indicate the representation is a mulitiview video plus depth representation. |
| reUseInit-SegmentFlag | A | 0, 1 | O Default: False | When True, indicate that the Representation utilizes the initialisation segment of the previous representation with the same repID and with a closest presentation time. |

Figure 3:
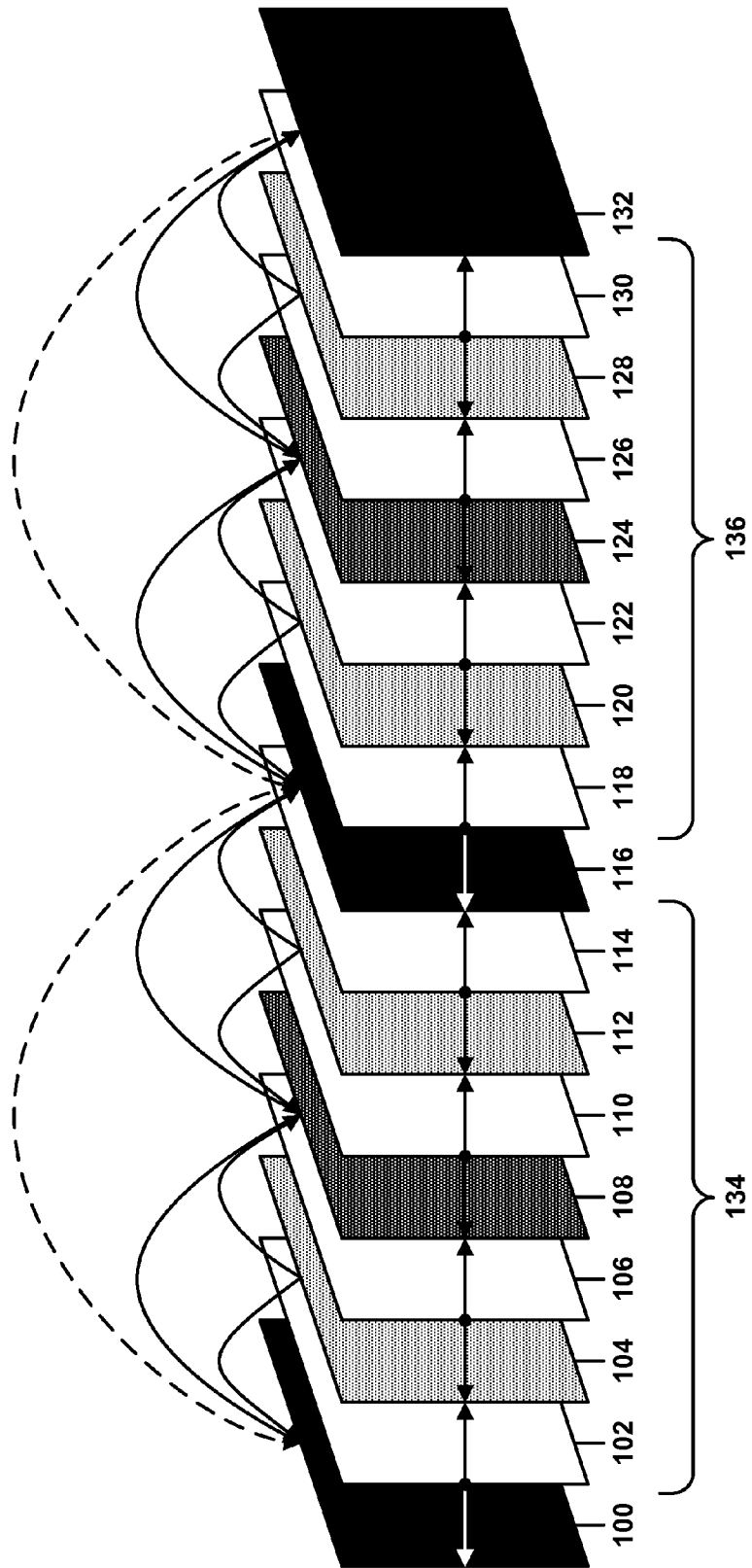
FIG. 3 is a conceptual diagram illustrating a sequence of coded video frames.

FIG. 3 is a conceptual diagram illustrating a sequence of coded video frames 100-132. The frames are shaded differently to indicate positions within a hierarchical prediction structure. For example, frames 100, 116, and 132 are shaded black to represent that frames 100, 116, 132 are at the top of the hierarchical prediction structure. Frames 100, 116, 132 may comprise, for example, intra-coded frames or inter-coded frames that are predicted from other frames in a single direction (e.g., P-frames). When intra-coded, frames 100, 116, 132 are predicted solely from data within the same frame. When inter-coded, frame 116, for example, may be coded relative to data of frame 100, as indicated by the dashed arrow from frame 116 to frame 100. Frames 116, 132 form key frames of groups of pictures (GOPs) 134, 136, respectively.

Frames 108, 124 are darkly shaded to indicate that they are next in the encoding hierarchy following frames 100, 116, and 132. Frames 108, 124 may comprise bi-directional, inter-mode prediction encoded frames. For example, frame 108 may be predicted from data of frames 100 and 116, while frame 124 may be predicted from frames 116 and 132. Frames 104, 112, 120, and 128 are lightly shaded to indicate that they are next in the encoding hierarchy following frames 108 and 124. Frames 104, 112, 120, and 128 may also comprise bi-directional, inter-mode prediction encoded frames. For example, frame 104 may be predicted from frames 100 and 108, frame 112 may be predicted from frames 108 and 116, frame 120 may be predicted from frame 116 and 124, and frame 128 may be predicted from frame 124 and 132.

Finally, frames 102, 106, 110, 114, 118, 122, 126, and 130 are shaded white to indicate that these frames are last in the encoding hierarchy. Frames 102, 106, 110, 114, 118, 122, 126, and 130 may be bi-directional, inter-mode prediction encoded frames. Frame 102 may be predicted from frames 100 and 104, frame 106 may be predicted from frames 104 and 108, frame 110 may be predicted from frames 108 and 112, frame 114 may be predicted from frames 112 and 116, frame 118 may be predicted from frame 116 and 120, frame 122 may be predicted from frames 120 and 124, frame 126 may be predicted from frames 124 and 128, and frame 130 may be predicted from frames 128 and 132.

Frames 100-132 are illustrated in display order. That is, following decoding, frame 100 is displayed before frame 102, frame 102 is displayed before frame 104, and so on. However, due to the encoding hierarchy, frames 100-132 may be decoded in a different order. Moreover, after being encoded, frames 100-132 may be arranged in decoding order in a bitstream including encoded data for frames 100-132. For example, frame 116 may be displayed last among frames of GOP 134. However, due to the encoding hierarchy, frame 116 may be decoded first of GOP 134. That is, in order to properly decode frame 108, for example, frame 116 may need to be decoded first, in order to act as a reference frame for frame 108. Likewise, frame 108 may act as a reference frame for frames 104, 106, 110, and 112, and therefore may need to be decoded before frames 104, 106, 110, and 112.

The time at which a frame is displayed may be referred to as presentation time, whereas the time at which the frame is decoded may be referred to as decoding time. Decoding times and presentation times generally provide indications of temporal ordering relative to other frames of the same sequence. The difference between a frame's decoding time and the frame's presentation time may be referred to as picture reordering delay for the frame. As discussed above, a source device (e.g., source device 20) may calculate a maximum picture reordering delay for a set of switchable representations to calculate a delay value to be signaled for the representations.

In this manner, a destination device, such as destination device 40, may use the signaled delay value to buffer a sufficient amount of data to provide seamless switching between two switchable representations. For example, suppose frames 100-132 are frames of a first representation. Destination device 40 may determine that network conditions have changed and that a second representation is better suited to the new network conditions. Destination device 40 may further determine that a random access point in the second representation exists having the same presentation time as frame 132. Destination device 40 may then retrieve each of frames 100-116 from the first representation, then retrieve frames with presentation times equal to those of frames 118-132 from the second representation. Destination device 40 may also retrieve a frame of the second representation having the same presentation time as frame 116 if the random access point is an open decoding refresh random access point, such that the frames of the second representation corresponding to frames 118-130 can be properly decoded.

FIG. 4 is a conceptual diagram illustrating switchable representations 154, 160. FIG. 4 illustrates a correspondence between raw video sequence 150 and fragments 158, 164 of representations 154, 160, respectively. In this example, representation 154 includes initialization segment 156 and fragments 158A-158N, and representation 160 includes initialization segment 162 and fragments 164A-164N.

Initialization segments 156, 162 may include similar or identical data. Accordingly, in some examples, a client device may retrieve initialization segment 156 and decode data of one or more of fragments 164 of representation 160 based on initialization segment 156 of representation 154, without retrieving initialization segment 162 of representation 160. The destination device may therefore switch between fragments 158 of representation 154 and fragments 164 of representation 160, without retrieving both of initialization segments 156, 162.

As an example, in 3GPP HTTP Streaming, initialization segments contain initialization information for accessing a corresponding representation, but the initialization segments do not contain media data. When streaming video coded with H.264/AVC, several parameters may be present prior to the first IDR picture of the video, such as a Sequence Parameter Set, Picture Parameter Set, and/or some sequence level Supplemental Enhancement Information (SEI) messages. Those parameters may be applicable for the entire representation, thus they may be included in the initialization segment, in accordance with the techniques of this disclosure, rather than including them in a media segment that contains the first IDR when the initialization segment is in use. Accordingly, initialization segments 156, 162 may include a sequence parameter set, a picture parameter set, and/or sequence level SEI messages for representations 154, 160, respectively.

The example of FIG. 4 illustrates fragments 158 and fragments 164 as having different sizes. This is to illustrate that the amount of memory occupied by fragments 158 is not necessarily the same as fragments 164. That is, fragment 158A, for example, is not the same size, in terms of memory consumption (and likewise bandwidth usage when transporting over a network) as fragment 164A. However, the dashed lines illustrate that fragment 158A and fragment 164A correspond to the same video segment 152A. Although fragments 158A and 164A are different sizes, they correspond to the same temporal region of video sequence 150. In other words, a starting presentation time and an ending presentation time for samples of fragment 158A correspond to starting and ending presentation times for samples of fragment 164.

In this manner, fragments 158 and 164 may be said to be timely aligned, assuming that random access points occur in the same points in representations 154 and 160. That is, when a random access point in one of fragments 158, the corresponding one of fragments 164 also has a random access point, and the random access points share a decoding order value. Timely alignment of representations may simplify the process of switching between two representations.

FIG. 5A is a conceptual diagram illustrating an example of two representations 180, 190 that are timely aligned. Representation 180 includes random access points (RAPs) 182A, 182B and samples 184A-184D. Random access points are samples with the additional property that a decoder can decode the random access point without having received any data preceding the random access point in the representation. Accordingly, random access points may generally be pictures that are intra-mode encoded.

Random access points 182 and samples 184 of representation 180 are illustrated in decoding time order, e.g., as the samples would be arranged in a bitstream sent from a server device to a client device. It should be understood that presentation times of random access points 182 and samples 184 do not necessarily match the decoding times.

Representation 190 of FIG. 5A includes random access points 192A, 192B and samples 194A-194D. Again, random access points 192 and samples 194 are illustrated in decoding time order, in this example. As can be seen, random access points 182 have corresponding random access points 192. That is, random access point 182A has the same decoding time as random access point 192A, and random access point 182B has the same decoding time as random access point 192B.

To switch from representation 180 to representation 190, a client device may buffer a certain number of samples (which may include random access points) of representation 180, based on a delay value received from a server device. The client device may then determine when the next random access point of representation 180 occurs, e.g., by analyzing signaled data from the server device that indicates locations, decoding times, and/or presentation times of random access points in representation 180. Suppose, for example, that the next random access point of representation 180 is random access point 182B. The client device may then request data of representation 190 starting at the random access point of representation 190 having the same decoding time as the determined random access point of representation 180. In this example, the client device would begin requesting data of representation 190 starting with random access point 192B, which has the same decoding time as random access point 182B.

In this manner, the client device may continually decode the data of representation 180 and begin retrieving data of representation 190 while decoding and reordering the buffered data of representation 180. After decoding all of the buffered data of representation 180, the client device may immediately begin decoding and reordering the retrieved data of representation 190. In this manner, the client device may perform seamless switching between two representations. That is, the client device may decode only one representation at a time (thus not requiring two or more decoders to effect the switch), and may also avoid gaps in playback, which may otherwise be caused by not having sufficient data buffered to perform the switch.

In the example above, representations 180 and 190 are timely aligned, enabling the client device to simply determine a random access point following the buffered data of representation 180, then request data of representation 190 at the random access point having the same decoding time as the determined random access point of representation 180. In other examples, two representations are not timely aligned, yet the techniques of this disclosure may still be used to switch between the representations.

FIG. 5B is a conceptual diagram illustrating an example of two representations 200, 210 that are not timely aligned. Representation 200 includes random access points 202A, 202B and samples 204A-204D, while representation 210 includes random access points 212A, 212B and samples 214A-214D. Again, random access points and samples in the example of FIG. 5B are illustrated in decoding time order.

In the example of FIG. 5B, representations 200 and 210 are not timely aligned. Specifically, in this example, random access point 202B does not have a corresponding random access point (that is, a random access point with the same decoding time) in representation 210. Likewise, random access point 212B does not have a corresponding random access point in representation 200. In general, two representations need not have the same number of random access points, and the random access points need not be timely aligned. Nevertheless, the techniques of this disclosure may still be applied to perform switching between two representations that are not timely aligned.

To switch between representation 200 and representation 210, for example, a client device may buffer a certain number of samples (which may include random access points) of representation 200, based on a delay value received from a server device. The server device may calculate the delay value as the sum of a maximum decoding delay, a maximum picture reordering delay, and (because representations 200 and 210 are not timely aligned), an overlap delay. Therefore, by buffering data based on the delay value, the client device may buffer a sufficient amount of data to ensure seamless switching between representations 200 and 210, which may account for decoding delay, picture reordering delay, and delay associated with the representations not being timely aligned.

The buffered data of representation 200 may include a fragment overlapping random access point 212B of representation 210. For example, the fragment may include random access point 202B and samples 204C and 204D (and potentially subsequent samples of representation 200 not illustrated in FIG. 5B). The fragment may "overlap" random access point 212B in the sense that the earliest presentation time of the samples in the fragment may be earlier than the presentation time of random access point 212B, but the latest presentation time of the samples in the fragment may be later than the presentation time of random access point 212B. Such a fragment is said to overlap the random access point. This disclosure may also refer to such a fragment as "spanning" the random access point. The fragment may correspond to the last buffered fragment of representation 200. That is, the client device may request data from representation 200 up to and including the fragment that overlaps the random access point of representation 210.

The client device may also locate a fragment of representation 210 including random access point 212B. The client device may request data from representation 210 starting at the fragment including random access point 212B. The client device may decode the data retrieved from representation 200 up to a group of pictures in the fragment overlapping random access point 212B. Upon reaching this group of pictures, the client device may begin decoding the data of representation 210. The client device may determine whether there are any pictures in representation 200 that have a presentation time earlier than the presentation time of random access point 212B, and decode any such pictures before decoding random access point 212B. In this manner, the client device may seamlessly switch between representations 200 and 210. That is, the client device may avoid gaps in video playback, while also avoiding parallel decoding, that is, operating two or more decoders at once to decode the representations.

Although in this example a certain amount of data may be retrieved that is not ultimately decoded, this retrieval of a small amount of extra data is outweighed by the benefits of not needing to perform parallel decoding of representations and also allows for seamless playback. Accordingly, the cost of retrieving the extra data may be considered negligible.

Figure 6:
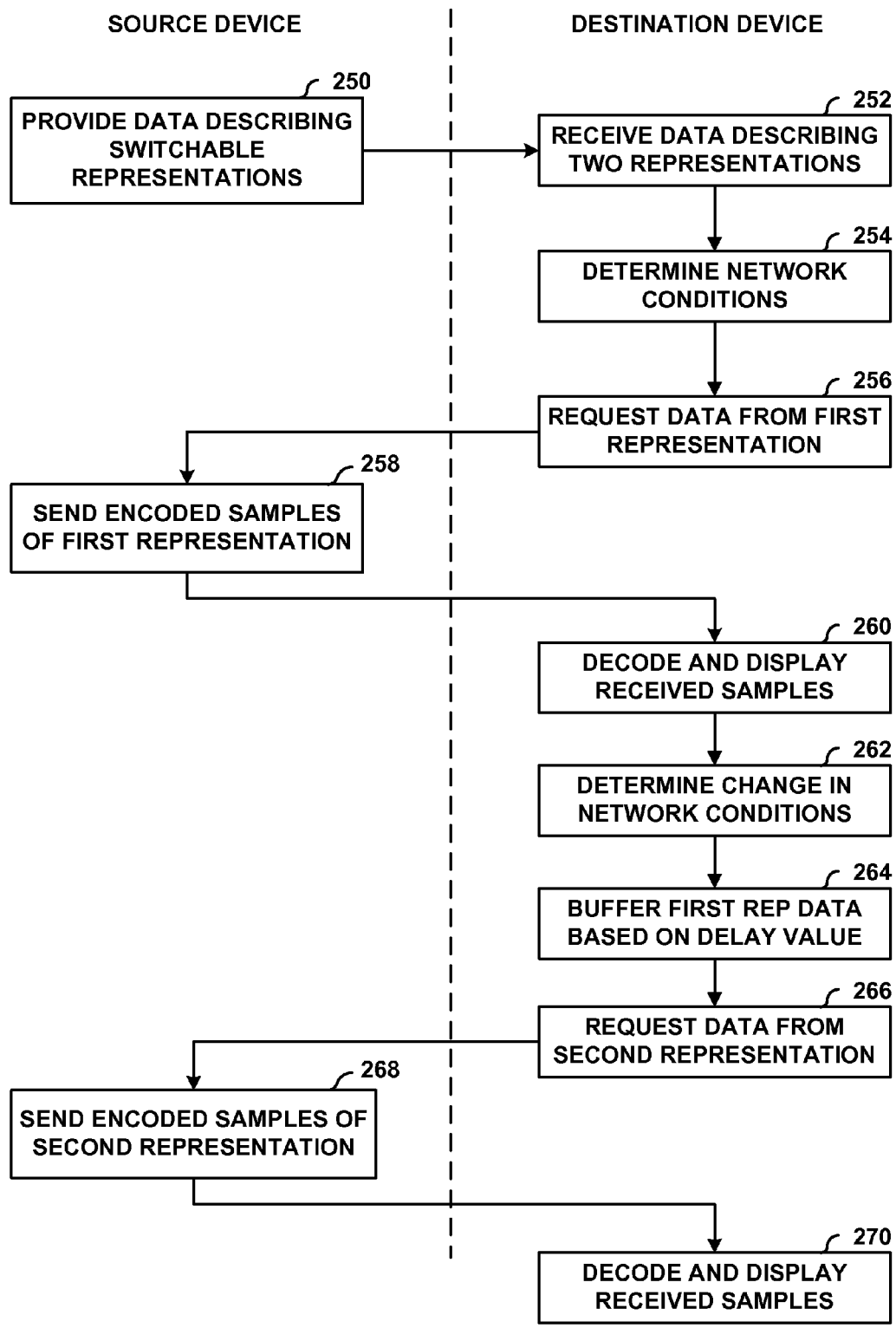
FIG. 6 is a flowchart illustrating an example method for performing seamless switching between two switchable representations.

FIG. 6 is a flowchart illustrating an example method for performing seamless switching between two switchable representations. Although described with respect to source device 20 and destination device 40 of FIG. 1, it should be understood that the techniques of FIG. 6 may be performed by any server and client devices. Moreover, the steps in the method need not necessarily occur in the precise order illustrated in FIG. 6, and additional steps may be added or some steps may be removed without departing from the techniques of this disclosure.

Initially, source device 20 may provide data describing two or more switchable representations (250) to destination device 40. This data may describe, for example, minimum network bandwidth requirements for smooth playback, profile and/or level requirements of a decoder device to decode and/or render encoded video data of the representations, locations (e.g., fragments and/or byte ranges) of random access points, decoding times of random access points, presentation times of random access points, decoding and/or presentation times of fragments of the representations, byte ranges of the fragments, uniform resource locators including the random access points, or other such data for decoding and/or rendering encoded video data.

The data may further indicate whether the two or more representations (or some subset thereof) form an efficient switch group, and whether any of the two or more representations are timely aligned. Furthermore, the data may include a delay value for switching between switchable representations. The delay value may correspond to the sum of a maximum decoding delay and a maximum picture reordering delay for the switchable representations. In addition, for representations that are not timely aligned, the delay value may account for an overlap delay.

Destination device 40 may receive the data describing the two or more representations (252). Destination device 40 may then determine current network conditions (254), e.g., available bandwidth, to initially select one of the representations. In addition, destination device 40 may determine its own decoding and/or rendering capabilities to select between the representations. That is, of the representations that destination device 40 is capable of decoding and rendering, destination device 40 may select one of the representations based on the current network conditions. For example, destination device 40 may select a first representation having a bandwidth requirement closest to but not exceeding the current available network bandwidth.

Destination device 40 may then request data from the first representation (256). For example, destination device 40 may generate an HTTP GET or partial GET request specifying a fragment of the first representation, and potentially a byte range of the fragment. In response to the request, source device 20 may send encoded samples of the first representation requested by destination device 40 to destination device 40 (258). Destination device 40 may decode and display the received samples (260). Assuming no change in the network conditions, destination device 40 may continue to request samples of the first representation, then decode and display the samples after they are received.

In the example of FIG. 6, destination device 40 may determine a change in network conditions (262). For example, destination device 40 may determine that available network bandwidth has increased or decreased. In response to determining a bandwidth increase, destination device 40 may select a second representation having a higher bandwidth requirement and a corresponding higher quality. On the other hand, in response to determining a bandwidth decrease, destination device 40 may select a second representation having a lower bandwidth requirement, albeit with a lower quality.

After determining that the network conditions have changed, destination device 40 may buffer an amount of data of the first representation based on the delay value received from source device 20 (264). For example, destination device 40 may determine a number of samples or a number of fragments to retrieve from the first representation based on the delay value to allow for seamless switching from the first representation to the second representation. Buffering the data may include generating one or more requests for data from the first representation and sending the requests to source device 20. After buffering this data from the first representation, destination device 40 may begin requesting data from the selected second representation (266).

In response to the request, source device 20 may send encoded samples of the second representation to destination device 40 (268). During this time, destination device 40 may continue decoding the buffered data of the first representation. After receiving the requested data from the second representation, and after decoding samples of the first representation having a presentation time before a random access point of the second representation, destination device 40 may begin decoding and displaying received samples of the second representation (270). In some examples, destination device 40 may request data from the second representation without requesting an initialization segment for the second representation. Accordingly, destination device 40 may use an initialization segment retrieved from the first representation to decode and display the samples of the second representation.

Figure 7:
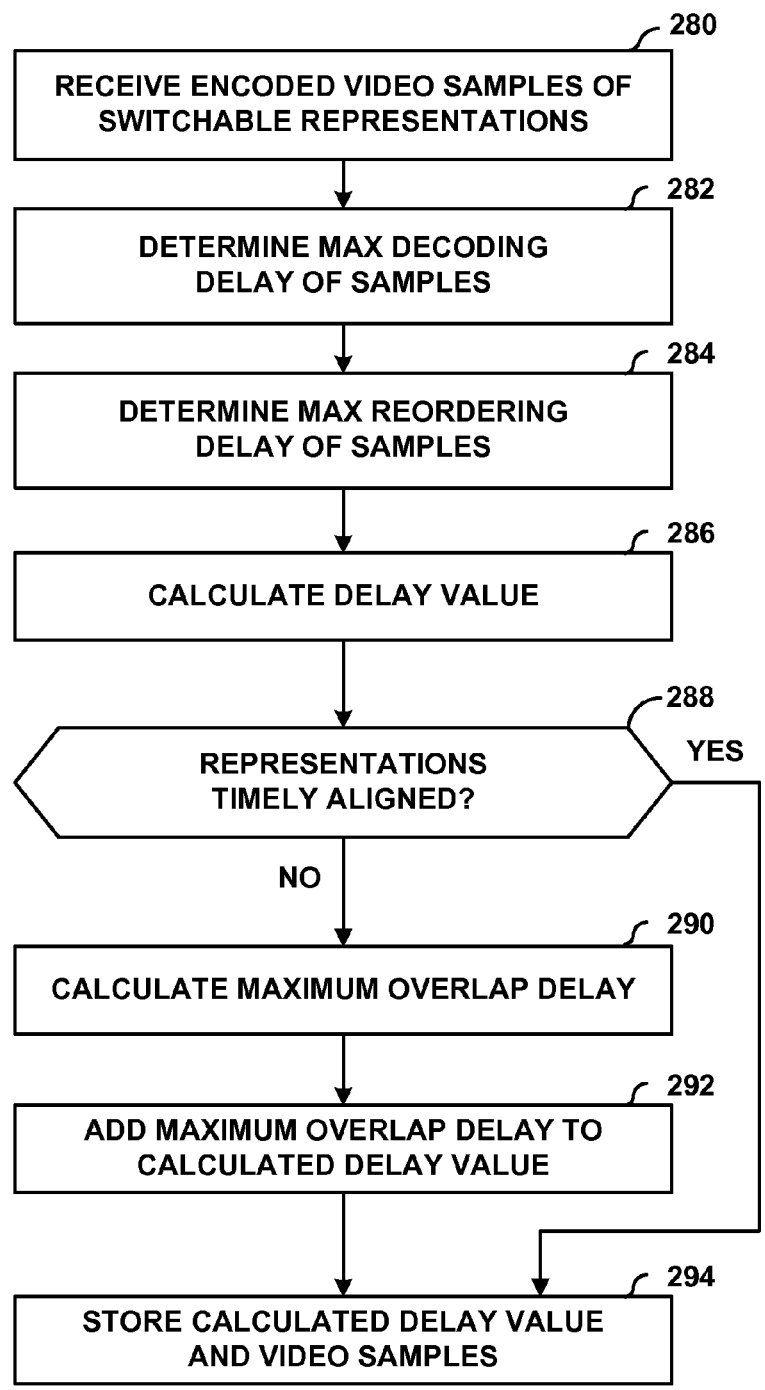
FIG. 7 is a flowchart illustrating an example method for a server device to provide information describing switchable representations to a client device.

FIG. 7 is a flowchart illustrating an example method for a server device, such as source device 20, to provide information describing switchable representations to a client device, such as destination device 40. Although described with respect to source device 20 and destination device 40 of FIG. 1, it should be understood that the techniques of FIG. 7 may be performed by any server and client devices. Moreover, the steps in the method need not necessarily occur in the precise order illustrated in FIG. 7, and additional steps may be added or some steps may be removed without departing from the techniques of this disclosure.

Initially, source device 20 may receive encoded video samples of two or more switchable representations (280). In some examples, source device 20 may receive raw video data and encode two or more switchable representations. In other examples, source device 20 may receive encoded representations from an intermediate device including an encoder, or multiple encoders, that produce the switchable representations. The representations may be timely aligned, in some examples, or in other examples, may not be timely aligned.

Source device 20 may determine a maximum decoding delay of the received samples of the switchable representations (282). For example, source device 20 may analyze the samples of each representation to determine a maximum decoding delay for each representation. Then, based on these determined maxima, source device 20 may calculate the maximum decoding delay of all of the representations. For example, suppose source device 20 receives samples for three representations. Source device 20 may determine a first maximum decoding delay for the first representation, a second maximum decoding delay for the second representation, and a third maximum decoding delay for the third representation. Source device 20 may then calculate the maximum of the first, second, and third maximum decoding delays as the maximum decoding delay of the switchable representations. The samples may comprise access units of the representations, such that the maximum decoding delay corresponds to the maximum delay associated with decoding any access unit of any of the switchable representations.

Source device 20 may also determine a maximum reordering delay of the samples (284). Again, source device 20 may analyze the samples for the switchable representations to calculate maximum reordering delays for each representation, then calculate the maximum of these to determine the maximum reordering delay associated with the switchable representations. In general, a picture reordering delay is the difference between the presentation time and decoding time for a frame of a representation. Accordingly, the maximum picture reordering delay may correspond to the maximum difference between the presentation time and decoding time of any frame of any of the switchable representations.

Source device 20 may then calculate a delay value associated with seamless switching between the switchable representations (286), e.g., as the sum of the maximum decoding delay and the maximum picture reordering delay. Source device 20 may further determine whether the representations are timely aligned (288). For example, source device 20 may determine that the representations are timely aligned only when, for any random access point in one of the representations, each of the other representations have a random access point having the same decoding times as the random access point of the one of the representations. Source device 20 may receive an indication from a decoding device as to whether the representations are timely aligned, or when source device 20 encodes the representations, may keep track of whether the representations are generated to be timely aligned.

If the representations are timely aligned ("YES" branch of 288), source device 20 may simply store the calculated delay value and encoded video samples (294). On the other hand, if the representations are not timely aligned ("NO" branch of 288), source device 20 may treat the delay value calculated at 286 as an intermediate delay value. Source device 20 may then calculate a maximum overlap delay for the switchable representations (290). The overlap delay of a picture may be based on a GOP structure of the current representation, as well as the location of the picture in the GOP. Source device 20 may calculate the maximum overlap delay for the switchable representations, then add the maximum overlap delay to the delay value calculated at step 286 (292). Source device 20 may then store this calculated delay value along with the video samples of the switchable representations (294). Source device 20 may, for example, generate signaling information that source device 20 may provide to destination device 40 in response to a request for such signaling information.

Figure 8:
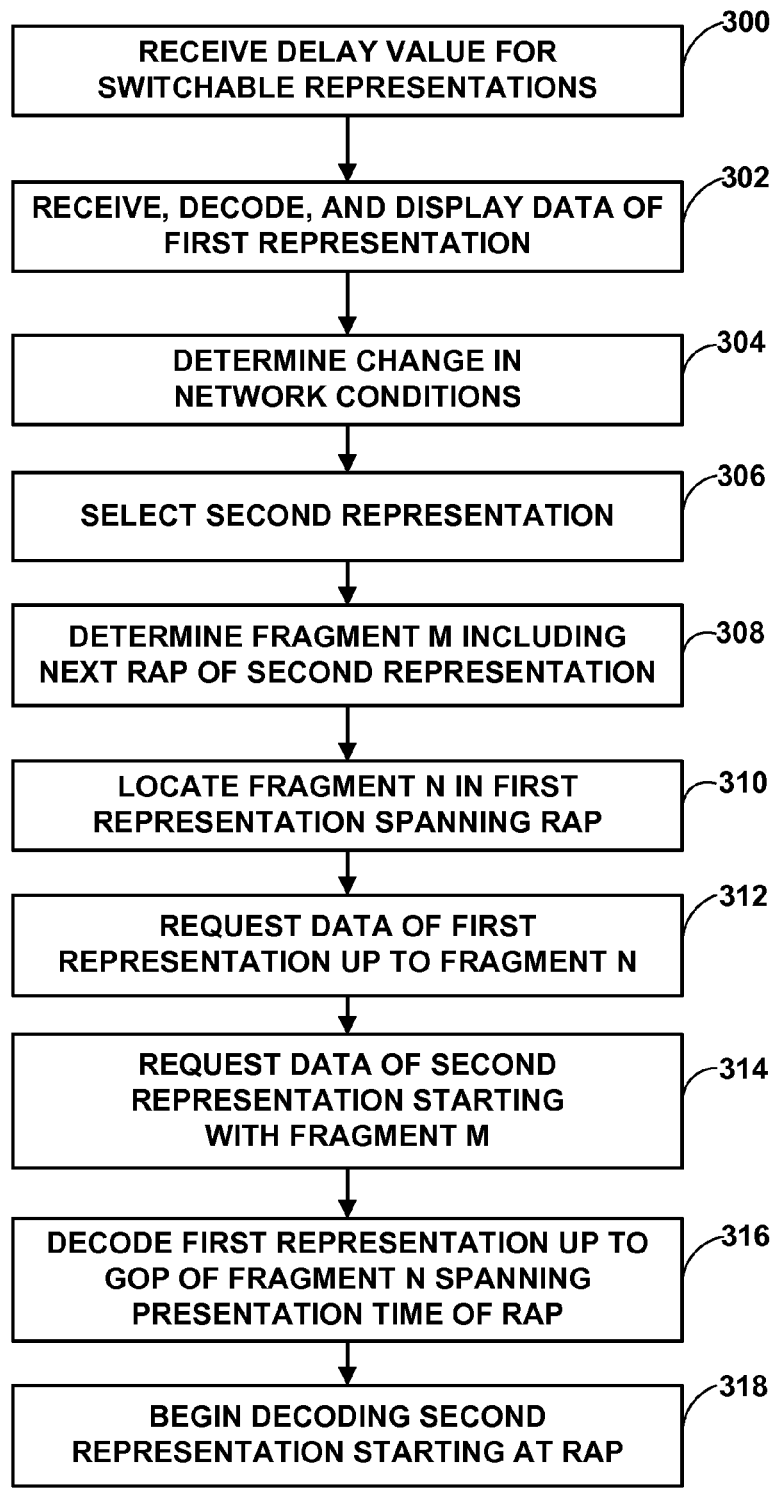
FIG. 8 is a flowchart illustrating an example method for a client device to switch from retrieving data of a first representation from a server device to retrieving data of a second representation from the server device.

FIG. 8 is a flowchart illustrating an example method for a client device, such as destination device 40, to switch from retrieving data of a first representation from a server device, such as source device 20, to retrieving data of a second representation from the server device. Although described with respect to source device 20 and destination device 40 of FIG. 1, it should be understood that the techniques of FIG. 8 may be performed by any server and client devices. Moreover, the steps in the method need not necessarily occur in the precise order illustrated in FIG. 8, and additional steps may be added or some steps may be removed without departing from the techniques of this disclosure. Moreover, the example of FIG. 8 presumes that the two representations are not timely aligned.

Initially, destination device 40 may receive a delay value for two or more switchable representations (300), e.g., from source device 20. Destination device 40 may receive additional information describing the switchable representations, such as locations of random access points, whether the representations are timely aligned, profile and/or level indicators that describe decoding and/or rendering requirements of client devices to successfully decode/render the representations, bandwidth limitations of the representations, or other such information.

Destination device 40 may receive, decode, and display data of a first representation (302). For example, destination device 40 may select the first representation based on current network conditions such as available bandwidth and decoding and rendering capabilities of destination device 40. Destination device 40 may then submit one or more requests for data from the first representation and begin decoding and displaying the data of the first representation after buffering a sufficient amount of data, based on the received delay value.

At some point, destination device 40 may determine that there has been a change in the network conditions (304), e.g., that available bandwidth has either increased or decreased. Accordingly, based on the new network conditions, destination device 40 may select a second representation that is switchable to the first representation (306). As noted above, it is assumed that the first representation and the second representation are not timely aligned in this example.

Destination device 40 may determine a fragment, labeled "fragment M" in this example, that includes a next random access point (RAP) in the second representation (308). That is, destination device 40 may determine a random access point of the second representation that has a presentation time later than the presentation times of the buffered data for the first representation. Destination device 40 may then determine fragment M, which includes the random access point.

Destination device 40 may then locate a fragment, labeled "fragment N" in this example, in the first representation that spans the random access point of the second representation (310). That is, destination device 40 may identify fragment N having an earliest presentation time that is earlier than the presentation time of the random access point of the second representation, and having a latest presentation time that is later than the presentation time of the random access point of the second representation.

Destination device 40 may request data from the first representation up to and including fragment N (312). After requesting fragment N, destination device 40 may begin requesting data from the second representation, starting with fragment M (314). Destination device 40 may decode all samples of the first representation up to a group of pictures that spans the presentation time of the random access point of fragment M (316).

Destination device 40 may ensure that all pictures having a presentation time earlier than the presentation time of the random access point in fragment M have been decoded and displayed, which may include pictures within the group of pictures mentioned above. After this, destination device 40 may begin decoding pictures of the second representation starting at the random access point (318). Destination device 40 may further display the decoded pictures of the second representation, which may require some amount of picture reordering.

In addition, destination device 40 may request and decode fragments of the second representation without requesting an initialization segment specific to the second representation. For example, when the received information indicates that the first and second representations are efficiently switchable, destination device 40 may decode and render the samples of the second representation based on an initialization segment received for the first representation. Accordingly, the method of FIG. 8 may further include requesting and receiving an initialization segment of the first representation prior to receiving, decoding, and displaying data of the first representation (e.g., prior to step 302).

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. The phrase "one or more processors" may include one or more cores of a multi-core processor, each of which may be included within a common chip (e.g., a single integrated circuit). A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of sending video data, the method comprising:
providing information to a client device for accessing data for a first representation of a video sequence and a second representation of the video sequence;
providing information to the client device indicating that the client device can, during transmission of the data for the first representation, switch to the second representation without experiencing a presentation gap when displaying the video sequence and without simultaneously executing more than one decoder to decode the data for the first representation and the second representation during the switch comprising sending, to the client device, a delay value for switching from the first representation to the second representation;
in response to a first request from the client device to retrieve data from the first representation, sending the requested data from the first representation to the client device;
in response to a second request from the client device to retrieve data from the second representation after sending the requested data from the first representation, sending the requested data from the second representation to the client device.

2. The method of claim 1, further comprising:
determining a maximum decoding delay for coded video samples of the first and second representations, wherein a decoding delay of a coded video sample comprises delay for decoding the coded video sample;
determining a maximum picture reordering delay for the coded video samples of the first and second representations, wherein a picture reordering delay for a coded video picture comprises the difference between a decoding time for the coded video picture and a presentation time for the coded video picture; and
calculating a delay value comprising the sum of the maximum decoding delay and the maximum picture reordering delay.

3. The method of claim 2, further comprising:
determining whether the coded video samples of the first and second representations are time-aligned; and
when the coded video samples of the first and second representations are not time-aligned, wherein calculating the delay value further comprises adding a time-alignment delay value to the sum of the maximum decoding delay and the maximum picture reordering delay, wherein the time-alignment delay value comprises a temporal difference between a last coded video sample of a last requested fragment of the first representation and a first coded video sample of a first fragment of the second representation.

4. A method of sending video data, the method comprising:
providing information to a client device for accessing data for a first representation of a video sequence and a second representation of the video sequence;
providing information to the client device indicating that the client device can, during transmission of the data for the first representation, switch to the second representation without experiencing a presentation gap when displaying the video sequence and without simultaneously executing more than one decoder to decode the data for the first representation and the second representation during the switch;
in response to a first request from the client device to retrieve data from the first representation, sending the requested data from the first representation to the client device;
determining a maximum size value of a random access point picture for coded video samples of the representations; and
sending the maximum size value to the client device.

5. A method of sending video data, the method comprising:
providing information to a client device for accessing data for a first representation of a video sequence and a second representation of the video sequence;
providing information to the client device indicating that the client device can, during transmission of the data for the first representation, switch to the second representation without experiencing a presentation gap when displaying the video sequence and without simultaneously executing more than one decoder to decode the data for the first representation and the second representation during the switch;
in response to a first request from the client device to retrieve data from the first representation, sending the requested data from the first representation to the client device;
receiving an initialization segment for the first representation;
determining that the second representation can be decoded based on the initialization segment of the first representation;
assigning a group identifier value to the first representation and to the second representation; and
sending the group identifier value to the client device, wherein sending the requested data from the first representation comprises sending the initialization segment to the client device; and
wherein sending the requested data of the second representation to the client device comprises sending the requested data of the second representation to the client device without sending an initialization segment of the second representation to the client device.

6. An apparatus for transferring video data, the apparatus comprising a processor configured to provide information to a client device for accessing data for a first representation of a video sequence and a second representation of the video sequence, provide information to the client device indicating that the client device can, during transmission of the data for the first representation, switch to the second representation without experiencing a presentation gap when displaying the video sequence and without simultaneously executing more than one decoder to decode the data for the first representation and the second representation during the switch, in response to a first request from the client device to retrieve data from the first representation, send the requested data from the first representation to the client device, in response to a second request from the client device to retrieve data from the second representation after sending the requested data from the first representation, send the requested data from the second representation to the client device, and send, to the client device, a delay value for switching from the first representation to the second representation.

7. The apparatus of claim 6, wherein the processor is configured to determine a maximum decoding delay for the coded video samples of the first and second representations, wherein a decoding delay of a coded video sample comprises delay for decoding the coded video sample, determine a maximum picture reordering delay for the coded video samples of the first and second representations, and wherein a picture reordering delay for a coded video picture comprises the difference between a decoding time for the coded video picture and a presentation time for the coded video picture, calculate a delay value comprising the sum of the maximum decoding delay and the maximum picture reordering delay.

8. The apparatus of claim 7, wherein the processor is configured to determine whether the coded video samples of the first and second representations are time-aligned, and, when the coded video samples of the first and second representations are not time-aligned, wherein calculating the delay value further comprises adding a time-alignment delay value to the sum of the maximum decoding delay and the maximum picture reordering delay, wherein the time-alignment delay value comprises a temporal difference between a last coded video sample of a last requested fragment of the first representation and a first coded video sample of a first fragment of the second representation.

9. An apparatus for transferring video data, the apparatus comprising a processor configured to provide information to a client device for accessing data for a first representation of a video sequence and a second representation of the video sequence, provide information to the client device indicating that the client device can, during transmission of the data for the first representation, switch to the second representation without experiencing a presentation gap when displaying the video sequence and without simultaneously executing more than one decoder to decode the data for the first representation and the second representation during the switch, in response to a first request from the client device to retrieve data from the first representation, send the requested data from the first representation to the client device, in response to a second request from the client device to retrieve data from the second representation after sending the requested data from the first representation, send the requested data from the second representation to the client device, wherein the processor is configured to determine a maximum size value of a random access point picture for coded video samples of the representations, and send the maximum size value to the client device.

10. An apparatus for transferring video data, the apparatus comprising a processor configured to provide information to a client device for accessing data for a first representation of a video sequence and a second representation of the video sequence, provide information to the client device indicating that the client device can, during transmission of the data for the first representation, switch to the second representation without experiencing a presentation gap when displaying the video sequence and without simultaneously executing more than one decoder to decode the data for the first representation and the second representation during the switch, in response to a first request from the client device to retrieve data from the first representation, send the requested data from the first representation to the client device, in response to a second request from the client device to retrieve data from the second representation after sending the requested data from the first representation, send the requested data from the second representation to the client device, wherein the processor is configured to receive an initialization segment for the first representation, determine that the second representation can be decoded based on the initialization segment of the first representation, assign a group identifier value to the first representation and to the second representation, and send the group identifier value to the client device, send the initialization segment to the client device with the requested data from the first representation, and send the requested data of the second representation to the client device without sending an initialization segment of the second representation to the client device.

11. The apparatus of claim 6, wherein the apparatus comprises at least one of:
an integrated circuit;
a microprocessor; and
a wireless communication device that includes the processor.

12. An apparatus for providing video data, the apparatus comprising:
means for providing information to a client device for accessing data for a first representation of a video sequence and a second representation of the video sequence;
means for providing information to the client device indicating that the client device can, during transmission of the data for the first representation, switch to the second representation without experiencing a presentation gap when displaying the video sequence and without simultaneously executing more than one decoder to decode the data for the first representation and the second representation during the switch;
means for, in response to a first request from the client device to retrieve data from the first representation, sending the requested data from the first representation to the client device;
means for, in response to a second request from the client device to retrieve data from the second representation after sending the requested data from the first representation, sending the requested data from the second representation to the client device; and
means for sending, to the client device, a delay value for switching from the first representation to the second representation.

13. The apparatus of claim 12, further comprising:
means for determining a maximum decoding delay for the coded video samples of the first and second representations, wherein a decoding delay of a coded video sample comprises delay for decoding the coded video sample;
means for determining a maximum picture reordering delay for the coded video samples of the first and second representations, wherein a picture reordering delay for a coded video picture comprises the difference between a decoding time for the coded video picture and a presentation time for the coded video picture; and
means for calculating a delay value comprising the sum of the maximum decoding delay and the maximum picture reordering delay.

14. The apparatus of claim 13, further comprising:
means for determining whether the coded video samples of the first and second representations are time-aligned; and
wherein the means for calculating the delay value further comprises means for adding a time-alignment delay value to the sum of the maximum decoding delay and the maximum picture reordering delay when the coded video samples of the first and second representations are not time-aligned, wherein the time-alignment delay value comprises a temporal difference between a last coded video sample of a last requested fragment of the first representation and a first coded video sample of a first fragment of the second representation.

15. An apparatus for providing video data, the apparatus comprising:
   means for providing information to a client device for accessing data for a first representation of a video sequence and a second representation of the video sequence;
   means for providing information to the client device indicating that the client device can, during transmission of the data for the first representation, switch to the second representation without experiencing a presentation gap when displaying the video sequence and without simultaneously executing more than one decoder to decode the data for the first representation and the second representation during the switch;
   means for, in response to a first request from the client device to retrieve data from the first representation, sending the requested data from the first representation to the client device;
   means for, in response to a second request from the client device to retrieve data from the second representation after sending the requested data from the first representation, sending the requested data from the second representation to the client device,
   means for determining a maximum size value of a random access point picture for coded video samples of the representations; and
   means for sending the maximum size value to the client device.

16. An apparatus for providing video data, the apparatus comprising:
   means for providing information to a client device for accessing data for a first representation of a video sequence and a second representation of the video sequence;
   means for providing information to the client device indicating that the client device can, during transmission of the data for the first representation, switch to the second representation without experiencing a presentation gap when displaying the video sequence and without simultaneously executing more than one decoder to decode the data for the first representation and the second representation during the switch;
   means for, in response to a first request from the client device to retrieve data from the first representation, sending the requested data from the first representation to the client device;
   means for, in response to a second request from the client device to retrieve data from the second representation after sending the requested data from the first representation, sending the requested data from the second representation to the client device,
   means for receiving an initialization segment for the first representation;
   means for determining that the second representation can be decoded based on the initialization segment of the first representation;
   means for assigning a group identifier value to the first representation and to the second representation; and
   means for sending the group identifier value to the client device,
   wherein the means for sending the requested data from the first representation comprises means for sending the initialization segment to the client device, and
   wherein the means for sending the requested data from the second representation comprises means for sending data of the second representation to the client device without sending an initialization segment of the second representation to the client device.

17. A computer program product comprising a computer-readable storage medium having stored thereon instructions that, when executed, cause a processor of a device for providing video data to:
   provide information to a client device for accessing data for a first representation of a video sequence and a second representation of the video sequence;
   provide information to the client device indicating that the client device can, during transmission of the data for the first representation, switch to the second representation without experiencing a presentation gap when displaying the video sequence and without simultaneously executing more than one decoder to decode the data for the first representation and the second representation during the switch;
   in response to a first request from the client device to retrieve data from the first representation, send the requested data from the first representation to the client device;
   in response to a second request from the client device to retrieve data from the second representation after sending the requested data from the first representation, send the requested data from the second representation to the client device; and
   send, to the client device, a delay value for switching from the first representation to the second representation.

18. The computer program product of claim 17, further comprising instructions that cause the processor to:
   determine a maximum decoding delay for coded video samples of the first and second representations, wherein a decoding delay of a coded video sample comprises delay for decoding the coded video sample;
   determine a maximum picture reordering delay for the coded video samples of the first and second representations, wherein a picture reordering delay for a coded video picture comprises the difference between a decoding time for the coded video picture and a presentation time for the coded video picture; and
   calculate a delay value comprising the sum of the maximum decoding delay and the maximum picture reordering delay.

19. The computer program product of claim 18, further comprising instructions that cause the processor to:
   determine whether the coded video samples of the first and second representations are time-aligned; and
   wherein the instructions that cause the processor to calculate the delay value comprise that cause the processor to, when the coded video samples of the first and second representations are not time-aligned, add a time-alignment delay value to the sum of the maximum decoding delay and the maximum picture reordering delay, wherein the time-alignment delay value comprises a temporal difference between a last coded video sample of a last requested fragment of the first representation and a first coded video sample of a first fragment of the second representation.

20. A computer program product comprising a computer-readable storage medium having stored thereon instructions that, when executed, cause a processor of a device for providing video data to:
- provide information to a client device for accessing data for a first representation of a video sequence and a second representation of the video sequence;
- provide information to the client device indicating that the client device can, during transmission of the data for the first representation, switch to the second representation without experiencing a presentation gap when displaying the video sequence and without simultaneously executing more than one decoder to decode the data for the first representation and the second representation during the switch;
- in response to a first request from the client device to retrieve data from the first representation, send the requested data from the first representation to the client device;
- in response to a second request from the client device to retrieve data from the second representation after sending the requested data from the first representation, send the requested data from the second representation to the client device;
- determine a maximum size value of a random access point picture for coded video samples of the representations; and
- send the maximum size value to the client device.

21. A computer program product comprising a computer-readable storage medium having stored thereon instructions that, when executed, cause a processor of a device for providing video data to:
- provide information to a client device for accessing data for a first representation of a video sequence and a second representation of the video sequence;
- provide information to the client device indicating that the client device can, during transmission of the data for the first representation, switch to the second representation without experiencing a presentation gap when displaying the video sequence and without simultaneously executing more than one decoder to decode the data for the first representation and the second representation during the switch;
- in response to a first request from the client device to retrieve data from the first representation, send the requested data from the first representation to the client device;
- in response to a second request from the client device to retrieve data from the second representation after sending the requested data from the first representation, send the requested data from the second representation to the client device;
- receive an initialization segment for the first representation;
- determine that the second representation can be decoded based on the initialization segment of the first representation;
- assign a group identifier value to the first representation and to the second representation; and
- send the group identifier value to the client device,
- wherein the instructions that cause the processor to send the data from the first representation comprise instructions that cause the processor to send the initialization segment to the client device, and
- wherein the instructions that cause the processor to send the data from the second representation comprises instructions that cause the processor to send data from the second representation to the client device without sending an initialization segment of the second representation to the client device.

22. A method of receiving video data, the method comprising:
- receiving a delay value indicative of a delay for switching between a first representation of a video sequence and a second representation of the video sequence;
- requesting data from the first representation of a video sequence in accordance with a streaming network protocol;
- in response to determining to switch from the first representation to the second representation, buffering an amount of data from the first representation based on the delay value;
- after buffering the amount of data from the first representation, requesting data from a second representation of the video sequence in accordance with the streaming network protocol; and
- requesting an initialization segment of the first representation prior to requesting the data of the first representation,
- wherein requesting the data from the second representation comprises requesting the data from the second representation without requesting an initialization segment of the second representation.

23. The method of claim 22, further comprising:
- detecting a change in network conditions; and
- based on the change in the network conditions, determining to switch from the first representation to the second network representation.

24. The method of claim 22, further comprising:
- receiving information indicating whether the first representation and the second representation are timely aligned; and
- selecting a random access point of the second representation based on the information.

25. A method of receiving video data, the method comprising:
- receiving a delay value indicative of a delay for switching between a first representation of a video sequence and a second representation of the video sequence;
- requesting data from the first representation of a video sequence in accordance with a streaming network protocol;
- in response to determining to switch from the first representation to the second representation, buffering an amount of data from the first representation based on the delay value;
- after buffering the amount of data from the first representation, requesting data from a second representation of the video sequence in accordance with the streaming network protocol;
- receiving information indicating whether the first representation and the second representation are timely aligned;
- selecting a random access point of the second representation based on the information;
- wherein when the first representation and the second representation are timely aligned,
- selecting the random access point comprises:
  - locating a first random access point of the first representation having an earliest presentation time value following presentation time values of samples of the buffered data of the first representation;

selecting a second random access point of the second representation having the same presentation time value as the first random access point, and
wherein requesting the data from the second representation comprises requesting a fragment of the second representation comprising the second random access point.

26. A method of receiving video data, the method comprising:
receiving a delay value indicative of a delay for switching between a first representation of a video sequence and a second representation of the video sequence;
requesting data from the first representation of a video sequence in accordance with a streaming network protocol;
in response to determining to switch from the first representation to the second representation, buffering an amount of data from the first representation based on the delay value;
after buffering the amount of data from the first representation, requesting data from a second representation of the video sequence in accordance with the streaming network protocol;
receiving information indicating whether the first representation and the second representation are timely aligned;
selecting a random access point of the second representation based on the information;
wherein when the first representation and the second representation are not timely aligned, the method comprises:
selecting the random access point comprises selecting a random access point of the second representation having a presentation time value later than a presentation time value of at least one sample of the buffered data of the first representation,
wherein buffering the amount of data comprises requesting and storing data of the first representation up to a first fragment having a starting presentation time value earlier than the presentation time value of the selected random access point and an ending presentation time value later than the presentation time value of the selected random access point, and
wherein requesting data from the second representation comprises requesting data of the second representation starting at a second fragment of the second representation comprising the selected random access point.

27. The method of claim 26, further comprising:
decoding the data of the first representation until reaching a group of pictures of the first fragment, the group of pictures comprising a first picture having a starting presentation time value earlier than a presentation time value of the selected random access point and an ending presentation time value later than the presentation time value of the selected random access point, and
after reaching the group of pictures of the first fragment, decoding the data of the second representation starting at the selected random access point.

28. An apparatus for receiving video data, the apparatus comprising a processor configured to receive a delay value indicative of a delay for switching between a first representation of a video sequence and a second representation of the video sequence, request data from the first representation of a video sequence in accordance with a streaming network protocol, in response to determining to switch from the first representation to the second representation, buffer an amount of data from the first representation based on the delay value, and, after buffering the amount of data from the first representation, request data from a second representation of the video sequence in accordance with the streaming network protocol, wherein the processor is configured to request an initialization segment of the first representation prior to requesting the data of the first representation, wherein the processor is configured to request the data from the second representation without requesting an initialization segment of the second representation.

29. The apparatus of claim 28, wherein the processor is configured to detect a change in network conditions, and, based on the change in the network conditions, determine to switch from the first representation to the second network representation.

30. The apparatus of claim 28, wherein the processor is configured to receive information indicating whether the first representation and the second representation are timely aligned, and select a random access point of the second representation based on the information.

31. An apparatus for receiving video data, the apparatus comprising a processor configured to receive a delay value indicative of a delay for switching between a first representation of a video sequence and a second representation of the video sequence, request data from the first representation of a video sequence in accordance with a streaming network protocol, in response to determining to switch from the first representation to the second representation, buffer an amount of data from the first representation based on the delay value, after buffering the amount of data from the first representation, request data from a second representation of the video sequence in accordance with the streaming network protocol, wherein the processor is configured to receive information indicating whether the first representation and the second representation are timely aligned, and select a random access point of the second representation based on the information, and, wherein to select the random access point when the first representation and the second representation are timely aligned, the processor is configured to locate a first random access point of the first representation having an earliest presentation time value following presentation time values of samples of the buffered data of the first representation, and select a second random access point of the second representation having the same presentation time value as the first random access point, wherein to request the data from the second representation, the processor is configured to request a fragment of the second representation comprising the second random access point.

32. An apparatus for receiving video data, the apparatus comprising a processor configured to receive a delay value indicative of a delay for switching between a first representation of a video sequence and a second representation of the video sequence, request data from the first representation of a video sequence in accordance with a streaming network protocol, in response to determining to switch from the first representation to the second representation, buffer an amount of data from the first representation based on the delay value, after buffering the amount of data from the first representation, request data from a second representation of the video sequence in accordance with the streaming network protocol, wherein the processor is configured to receive information indicating whether the first representation and the second representation are timely aligned, and select a random access point of the second representation based on the information, and, wherein the processor is configured to, when the first representation and the second representation are not timely aligned, select the random access point comprises selecting a random access point of the second representation having a presentation time value later than a presentation time value of at least one sample of the buffered data of the first representation, wherein to buffer the amount of data, the processor is configured to request and store data of the first representation up to a first fragment having a starting presentation time value earlier than the presentation time value of the selected random access point and an ending presentation time value later than the presentation time value of the selected random access point, and to request data from the second representation, the processor is configured to request data of the second representation starting at a second fragment of the second representation comprising the selected random access point.

33. The apparatus of claim 32, further comprising a video decoder configured to decode the data of the first representation until reaching a group of pictures of the first fragment, the group of pictures comprising a first picture having a starting presentation time value earlier than a presentation time value of the selected random access point and an ending presentation time value later than the presentation time value of the selected random access point, and, after reaching the group of pictures of the first fragment, decode the data of the second representation starting at the selected random access point.

34. The apparatus of claim 28, wherein the apparatus comprises at least one of:
an integrated circuit;
a microprocessor; and
a wireless communication device that includes the processor.

35. An apparatus for receiving video data, the apparatus comprising:
means for receiving a delay value indicative of a delay for switching between a first representation of a video sequence and a second representation of the video sequence;
means for requesting data from the first representation of a video sequence in accordance with a streaming network protocol;
means for in response to determining to switch from the first representation to the second representation, buffering an amount of data from the first representation based on the delay value;
means for requesting, after buffering the amount of data from the first representation, data from a second representation of the video sequence in accordance with the streaming network protocol; and
means for requesting an initialization segment of the first representation prior to requesting the data of the first representation,
wherein the means for requesting the data from the second representation comprises means for requesting the data from the second representation without requesting an initialization segment of the second representation.

36. The apparatus of claim 35, further comprising:
means for detecting a change in network conditions; and
means for determining, based on the change in the network conditions, to switch from the first representation to the second network representation.

37. The apparatus of claim 35, further comprising:
means for receiving information indicating whether the first representation and the second representation are timely aligned; and
means for selecting a random access point of the second representation based on the information.

38. An apparatus for receiving video data, the apparatus comprising:
means for receiving a delay value indicative of a delay for switching between a first representation of a video sequence and a second representation of the video sequence;
means for requesting data from the first representation of a video sequence in accordance with a streaming network protocol;
means for in response to determining to switch from the first representation to the second representation, buffering an amount of data from the first representation based on the delay value;
means for requesting, after buffering the amount of data from the first representation, data from a second representation of the video sequence in accordance with the streaming network protocol;
means for receiving information indicating whether the first representation and the second representation are timely aligned;
means for selecting a random access point of the second representation based on the information, wherein when the first representation and the second representation are timely aligned, the means for selecting the random access point comprises:
means for locating a first random access point of the first representation having an earliest presentation time value following presentation time values of samples of the buffered data of the first representation; and
means for selecting a second random access point of the second representation having the same presentation time value as the first random access point,
wherein the means for requesting the data from the second representation comprises means for requesting a fragment of the second representation comprising the second random access point.

39. An apparatus for receiving video data, the apparatus comprising:
means for receiving a delay value indicative of a delay for switching between a first representation of a video sequence and a second representation of the video sequence;
means for requesting data from the first representation of a video sequence in accordance with a streaming network protocol;
means for in response to determining to switch from the first representation to the second representation, buffering an amount of data from the first representation based on the delay value;
means for requesting, after buffering the amount of data from the first representation, data from a second representation of the video sequence in accordance with the streaming network protocol;
means for receiving information indicating whether the first representation and the second representation are timely aligned;
means for selecting a random access point of the second representation based on the information, wherein when the first representation and the second representation are not timely aligned:
the means for selecting the random access point comprises means for selecting a random access point of the second representation having a presentation time value later than a presentation time value of at least one sample of the buffered data of the first representation,
the means for buffering the amount of data comprises means for requesting and storing data of the first representation up to a first fragment having a starting presentation time value earlier than the presentation time value of the selected random access point and an ending presentation time value later than the presentation time value of the selected random access point, and the means for requesting data from the second representation comprises means for requesting data of the second representation starting at a second fragment of the second representation comprising the selected random access point.

40. The apparatus of claim 39, further comprising:

means for decoding the data of the first representation until reaching a group of pictures of the first fragment, the group of pictures comprising a first picture having a starting presentation time value earlier than a presentation time value of the selected random access point and an ending presentation time value later than the presentation time value of the selected random access point, and means for decoding, after reaching the group of pictures of the first fragment, the data of the second representation starting at the selected random access point.

41. A computer program product comprising a computer-readable storage medium having stored thereon instructions that, when executed, cause a processor of a device for receiving video data to:

receive a delay value indicative of a delay for switching between a first representation of a video sequence and a second representation of the video sequence;

request data from the first representation of a video sequence in accordance with a streaming network protocol;

in response to determining to switch from the first representation to the second representation, buffer an amount of data from the first representation based on the delay value; and after buffering the amount of data from the first representation, request data from a second representation of the video sequence in accordance with the streaming network protocol; and request an initialization segment of the first representation prior to requesting the data of the first representation, wherein the means for requesting the data from the second representation comprises means for requesting the data from the second representation without requesting an initialization segment of the second representation.

42. The computer program product of claim 41, further comprising instructions that cause the processor to:

detect a change in network conditions; and based on the change in the network conditions, determine to switch from the first representation to the second network representation.

43. The computer program product of claim 41, further comprising instructions that cause the processor to:

receive information indicating whether the first representation and the second representation are timely aligned; and select a random access point of the second representation based on the information.

44. A computer program product comprising a computer-readable storage medium having stored thereon instructions that, when executed, cause a processor of a device for receiving video data to:

receive a delay value indicative of a delay for switching between a first representation of a video sequence and a second representation of the video sequence;

request data from the first representation of a video sequence in accordance with a streaming network protocol;

in response to determining to switch from the first representation to the second representation, buffer an amount of data from the first representation based on the delay value;

after buffering the amount of data from the first representation, request data from a second representation of the video sequence in accordance with the streaming network protocol;

receive information indicating whether the first representation and the second representation are timely aligned;

select a random access point of the second representation based on the information, wherein when the first representation and the second representation are timely aligned, the instructions that cause the processor to selecting the random access point comprises:

locate a first random access point of the first representation having an earliest presentation time value following presentation time values of samples of the buffered data of the first representation; and selecting a second random access point of the second representation having the same presentation time value as the first random access point, wherein requesting the data from the second representation comprises requesting a fragment of the second representation comprising the second random access point.

45. A computer program product comprising a computer-readable storage medium having stored thereon instructions that, when executed, cause a processor of a device for receiving video data to:

receive a delay value indicative of a delay for switching between a first representation of a video sequence and a second representation of the video sequence;

request data from the first representation of a video sequence in accordance with a streaming network protocol;

in response to determining to switch from the first representation to the second representation, buffer an amount of data from the first representation based on the delay value;

after buffering the amount of data from the first representation, request data from a second representation of the video sequence in accordance with the streaming network protocol;

receive information indicating whether the first representation and the second representation are timely aligned;

select a random access point of the second representation based on the information, further comprising instructions that cause the processor to, when the first representation and the second representation are not timely aligned:

select the random access point comprises selecting a random access point of the second representation having a presentation time value later than a presentation time value of at least one sample of the buffered data of the first representation, wherein the instructions that cause the processor to buffer the amount of data comprise that cause the processor to request and store data of the first representation up to a first fragment having a starting presentation time value earlier than the presentation time value of the selected random access point and an ending presentation time value later than the presentation time value of the selected random access point, and wherein the instructions that cause the processor to request data from the second representation comprise instructions that cause the processor to request data of the second representation starting at a second fragment of the second representation comprising the selected random access point.

46. The computer program product of claim 45, further comprising instructions that cause the processor to:
   decode the data of the first representation until reaching a group of pictures of the first fragment, the group of pictures comprising a first picture having a starting presentation time value earlier than a presentation time value of the selected random access point and an ending presentation time value later than the presentation time value of the selected random access point; and
   after reaching the group of pictures of the first fragment, decode the data of the second representation starting at the selected random access point.

* * * * *